US008656314B2

(12) United States Patent
Locker et al.

(10) Patent No.: US 8,656,314 B2
(45) Date of Patent: Feb. 18, 2014

(54) FINGER TOUCH GESTURE FOR JOINING AND UNJOINING DISCRETE TOUCH OBJECTS

(75) Inventors: Howard Locker, Cary, NC (US); Eric Edward Dudkowski, Raleigh, NC (US); Matthew P. Lietzke, Cary, NC (US); Jeffrey E. Skinner, Raleigh, NC (US); Adam Miles Smith, Chapel Hill, NC (US); Aaron Michael Stewart, Raleigh, NC (US); Russell Speight VanBlon, Brentwood, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 546 days.

(21) Appl. No.: 12/512,799

(22) Filed: Jul. 30, 2009

(65) Prior Publication Data
US 2011/0029934 A1   Feb. 3, 2011

(51) Int. Cl.
G06F 3/033 (2013.01)
G06F 3/03 (2006.01)

(52) U.S. Cl.
USPC ............ 715/863; 715/769; 345/173; 345/619

(58) Field of Classification Search
USPC ........................... 715/863, 769; 345/173, 619
See application file for complete search history.

(56) References Cited

U.S. PATENT DOCUMENTS

| 5,247,651 A | 9/1993 | Clarisse |
| 5,471,248 A | 11/1995 | Bhargava et al. |
| 5,515,489 A | 5/1996 | Yaeger |
| 5,544,354 A | 8/1996 | May et al. ............................. 1/1 |
| 5,588,107 A | 12/1996 | Bowden et al. ............... 715/828 |
| 5,644,737 A | 7/1997 | Tuniman et al. ............... 715/810 |
| 5,712,995 A | 1/1998 | Cohn ............................ 715/792 |
| 5,793,370 A | 8/1998 | Bates et al. .................... 715/799 |
| 5,812,804 A | 9/1998 | Bates et al. .................... 715/799 |
| 5,856,826 A | 1/1999 | Craycroft ....................... 715/788 |
| 5,966,122 A * | 10/1999 | Itoh ............................... 715/838 |
| 5,984,502 A | 11/1999 | Calder ........................... 700/83 |

(Continued)

FOREIGN PATENT DOCUMENTS

| CN | 101436113 | 5/2009 |
| WO | 2007121557 | 11/2007 |

OTHER PUBLICATIONS

Final Office Action for U.S. Appl. No. 12/512,751 (Lietzke et al., "Emulating Fundamental Forces of Physics on a Virtual, Touchable Object," filed Jul. 30, 2009), U.S. Patent and Trademark Office, mailed Feb. 16, 2012, 17 pages.

(Continued)

Primary Examiner — Amy Ng
Assistant Examiner — Toan Vu
(74) Attorney, Agent, or Firm — John L. Rogitz; John M. Rogitz

(57) ABSTRACT

An approach is provided to join graphical user interface objects into a group. A request is received at a touch-enabled display screen to join a first graphical user interface object with a second graphical user interface object. The request is from a user of the system. The first and second graphical user interface objects are then associated with each other. The first and second graphical user interface objects are displayed on the touch-enabled display screen adjacent to each other and a visual indicator is also displayed near the objects that indicates that the objects have been joined in a group.

20 Claims, 25 Drawing Sheets

(56) References Cited

U.S. PATENT DOCUMENTS

| | | | | |
|---|---|---|---|---|
| 5,986,657 | A | 11/1999 | Berteig et al. | 715/792 |
| 5,995,101 | A * | 11/1999 | Clark et al. | 715/711 |
| 6,031,532 | A | 2/2000 | Gourdol et al. | |
| 6,182,094 | B1 | 1/2001 | Humpleman et al. | 715/234 |
| 6,317,132 | B1 | 11/2001 | Perlin | 345/475 |
| 6,433,771 | B1 | 8/2002 | Yocum et al. | 345/156 |
| 6,590,568 | B1 * | 7/2003 | Astala et al. | 345/173 |
| 6,686,938 | B1 | 2/2004 | Jobs et al. | 715/835 |
| 6,704,026 | B2 | 3/2004 | Kurihara et al. | |
| 6,724,403 | B1 | 4/2004 | Santoro et al. | |
| 6,750,803 | B2 | 6/2004 | Yates et al. | |
| 7,389,379 | B1 | 6/2008 | Goel et al. | |
| 7,404,144 | B2 | 7/2008 | Silverbrook et al. | 715/700 |
| 7,447,999 | B1 * | 11/2008 | Robertson et al. | 715/835 |
| 7,526,482 | B2 | 4/2009 | Edwards et al. | |
| 7,565,319 | B1 | 7/2009 | Strauss et al. | 705/37 |
| 7,725,832 | B2 | 5/2010 | Cadiz et al. | |
| 7,765,490 | B2 | 7/2010 | Lai et al. | 715/810 |
| 7,770,120 | B2 | 8/2010 | Baudisch | |
| 7,770,125 | B1 * | 8/2010 | Young et al. | 715/764 |
| 7,890,927 | B2 | 2/2011 | Eldridge et al. | 717/110 |
| 7,904,821 | B1 | 3/2011 | Tertitski et al. | 715/762 |
| 7,933,632 | B2 | 4/2011 | Flynt et al. | |
| 7,941,786 | B2 | 5/2011 | Scott et al. | 717/121 |
| 8,000,457 | B2 | 8/2011 | Harper | 379/100.01 |
| 8,046,712 | B2 | 10/2011 | Landman et al. | |
| 8,261,186 | B2 | 9/2012 | Mansfield et al. | |
| 8,335,675 | B1 | 12/2012 | DiVerdi et al. | |
| 8,392,849 | B2 | 3/2013 | Jung | |
| 2001/0030664 | A1 | 10/2001 | Shulman et al. | 345/835 |
| 2002/0126161 | A1 * | 9/2002 | Kuzunuki et al. | 345/863 |
| 2002/0171675 | A1 | 11/2002 | Fox et al. | 345/701 |
| 2002/0171689 | A1 | 11/2002 | Fox et al. | 345/860 |
| 2002/0186257 | A1 | 12/2002 | Cadiz et al. | |
| 2002/0199129 | A1 | 12/2002 | Bohrer et al. | |
| 2003/0007007 | A1 * | 1/2003 | Hinegardner et al. | 345/769 |
| 2003/0016247 | A1 | 1/2003 | Lai et al. | |
| 2003/0064757 | A1 | 4/2003 | Yamadera et al. | |
| 2003/0193481 | A1 | 10/2003 | Sokolsky | |
| 2004/0066414 | A1 * | 4/2004 | Czerwinski et al. | 345/781 |
| 2004/0111673 | A1 | 6/2004 | Bowman et al. | 715/513 |
| 2004/0128277 | A1 * | 7/2004 | Mander et al. | 707/1 |
| 2005/0021935 | A1 | 1/2005 | Schillings et al. | 713/1 |
| 2005/0044502 | A1 | 2/2005 | Fu | 715/734 |
| 2005/0066292 | A1 * | 3/2005 | Harrington | 715/835 |
| 2005/0076157 | A1 | 4/2005 | Serizawa et al. | |
| 2005/0114778 | A1 * | 5/2005 | Branson et al. | 715/711 |
| 2005/0128182 | A1 | 6/2005 | Gordon | 345/156 |
| 2005/0216859 | A1 | 9/2005 | Paek et al. | 715/810 |
| 2005/0289478 | A1 | 12/2005 | Landman et al. | |
| 2006/0020904 | A1 * | 1/2006 | Aaltonen et al. | 715/850 |
| 2006/0078224 | A1 | 4/2006 | Hirosawa | |
| 2006/0112335 | A1 * | 5/2006 | Hofmeister et al. | 715/701 |
| 2006/0143572 | A1 | 6/2006 | Scott et al. | 715/765 |
| 2006/0179415 | A1 | 8/2006 | Cadiz et al. | |
| 2006/0187201 | A1 | 8/2006 | Rosenberg et al. | 345/156 |
| 2007/0005413 | A1 | 1/2007 | Hennings et al. | |
| 2007/0016872 | A1 * | 1/2007 | Cummins et al. | 715/769 |
| 2007/0082707 | A1 | 4/2007 | Flynt et al. | 455/564 |
| 2007/0101297 | A1 | 5/2007 | Forstall et al. | |
| 2007/0118794 | A1 | 5/2007 | Hollander et al. | |
| 2007/0177803 | A1 | 8/2007 | Elias et al. | |
| 2007/0188518 | A1 * | 8/2007 | Vale et al. | 345/619 |
| 2008/0010041 | A1 | 1/2008 | McDaniel | 703/1 |
| 2008/0168367 | A1 | 7/2008 | Chaudhri et al. | 715/764 |
| 2008/0215998 | A1 | 9/2008 | Moore et al. | 715/762 |
| 2008/0235602 | A1 | 9/2008 | Strauss et al. | |
| 2008/0307359 | A1 * | 12/2008 | Louch et al. | 715/835 |
| 2009/0006993 | A1 | 1/2009 | Tuli et al. | |
| 2009/0042619 | A1 | 2/2009 | Pierce et al. | 455/566 |
| 2009/0058819 | A1 | 3/2009 | Gioscia et al. | 345/173 |
| 2009/0063659 | A1 | 3/2009 | Kazerouni et al. | 709/219 |
| 2009/0089697 | A1 | 4/2009 | Loucks | 715/771 |
| 2009/0125130 | A1 | 5/2009 | Eldridge et al. | 700/87 |
| 2009/0172273 | A1 | 7/2009 | Piszczek et al. | |
| 2009/0193363 | A1 | 7/2009 | Atherton | |
| 2009/0248883 | A1 | 10/2009 | Suryanarayana et al. | 709/229 |
| 2009/0259957 | A1 | 10/2009 | Slocum et al. | 715/765 |
| 2009/0271723 | A1 * | 10/2009 | Matsushima et al. | 715/769 |
| 2009/0276701 | A1 * | 11/2009 | Nurmi | 715/702 |
| 2009/0307622 | A1 | 12/2009 | Jalon et al. | 715/765 |
| 2009/0307623 | A1 * | 12/2009 | Agarawala et al. | 715/765 |
| 2009/0307631 | A1 | 12/2009 | Kim et al. | 715/830 |
| 2009/0313567 | A1 * | 12/2009 | Kwon et al. | 715/769 |
| 2009/0315867 | A1 * | 12/2009 | Sakamoto et al. | 345/184 |
| 2009/0319951 | A1 | 12/2009 | Benedetti et al. | |
| 2010/0013761 | A1 | 1/2010 | Birnbaum et al. | 345/156 |
| 2010/0022276 | A1 | 1/2010 | Park et al. | 455/566 |
| 2010/0058182 | A1 | 3/2010 | Jung | |
| 2010/0083111 | A1 * | 4/2010 | de los Reyes | 715/702 |
| 2010/0095248 | A1 | 4/2010 | Karstens | 715/846 |
| 2010/0127847 | A1 | 5/2010 | Evans et al. | 340/461 |
| 2010/0177931 | A1 | 7/2010 | Whytock et al. | |
| 2011/0012848 | A1 | 1/2011 | Li et al. | 345/173 |
| 2011/0025632 | A1 | 2/2011 | Lee | 345/173 |
| 2011/0107265 | A1 | 5/2011 | Buchanan et al. | 715/835 |
| 2011/0173556 | A1 * | 7/2011 | Czerwinski et al. | 715/771 |
| 2011/0314424 | A1 | 12/2011 | Gusmorino et al. | 715/846 |

OTHER PUBLICATIONS

Final Office Action for U.S. Appl. No. 12/512,728 (Stewart et al., "Touch-Optimized Approach for Controlling Computer Function Using Touch Sensitive Tiles"), U.S. Patent and Trademark Office, mailed Jan. 19, 2012, 19 pages.

Office Action for U.S. Appl. No. 12/512,778 (Smith et al., "Behavior and Appearance of Touch-Optimized User Interface Elements for Controlling Computer Function"), U.S. Patent and Trademark Office, mailed Feb. 2, 2012, 24 pages.

Adam Miles Smith, Eric Edward Dudkowski, Matthew P. Lietzke, Howard Locker, Jeffrey E. Skinner, Aaron Michael Stewart, Russell Speight VanBlon, "Behavior and Appearance of Touch-Optimized User Interface Elements for Controlling Computer Function" related U.S. Appl. No. 12/512,778, non-final office action dated Apr. 17, 2013.

Wikipedia, the free encyclopedia: Tiling Window manager, printed Mar. 26, 2013. http://web.archive.org/web/20080324103957/http://en.wikipedia.org/wiki/tilting_window_manager.

Office Action for U.S. Appl. No. 12/512,728 (Stewart et al., "Touch-Optimized Approach for Controlling Computer Function Using Touch Sensitive Tiles," filed Jul. 30, 2009), U.S. Patent and Trademark Office, mailed Oct. 4, 2011, 19 pages.

Office Action for U.S. Appl. No. 12/512,751 (Lietzke et al., "Emulating Fundamental Forces of Physics on a Virtual, Touchable Object," filed Jul. 30, 2009), U.S. Patent and Trademark Office, mailed Sep. 7, 2011, 18 pages.

Physics for the 21st Century, "Section 2:Nature's Strongest and Weakest Force". http://www.learner.org/courses/physics/unit/text.html?unit=3&secNum=2—printed from website Jun. 5, 2013.

Microsoft Office Word 2007 Tutorial document, http://www.java2s.com/Tutorial/Microsoft-Office-Word_2007/0020_Introduction/ArrangeAll.htm—printed from website Jun. 5, 2013.

Philip Lee Childs, Donald R. Frame, Michael Scott Mettler, Kenneth Dean Timmons, "Hard Disk Drive Reliability in Server Environment Using Forced Hot Swapping" related U.S. Appl. No. 13/324,985, non-final office action dated Jun. 27, 2013.

Philip Lee Childs, Donald R. Frame, Michael Scott Mettler, Kenneth Dean Timmons, "Hard Disk Drive Reliability in Server Environment Using Forced Hot Swapping" related U.S. Appl. No. 13/324,985, applicants response to non-final office action filed Jul. 3, 2013.

Adam Miles Smith, Eric Edward Dudkowski, Howard Locker, Jeffrey E. Skinner, Aaron Michael Stewart, Russell Speight VanBlon, "Behavior and Appearance of Touch-Optimized User Interface Elements for Controlling Computer Function" related U.S. Appl. No. 12/512,778, final office action dated Jun. 21, 2013.

Adam Miles Smith, Eric Edward Dudkowski, Howard Locker, Jeffrey E. Skinner, Aaron Michael Stewart, Russell Speight VanBlon, "Behavior and Appearance of Touch-Optimized User Interface Ele-

(56) References Cited

OTHER PUBLICATIONS ments for Controlling Computer Function" related U.S. Appl. No. 12/512,778, applicants response to final office action filed Jul. 3, 2013.

Matthew P. Lietzke, Eric Edward Dudkowski, Timothy Humphrey, Howard Locker, Jeffrey E. Skinner, Adam Miles Smith, Aaron Michael Stewart, Russell Speight VanBlon, "Emulating Fundamental Forces of Physics on a Virtual, Touchable Object" related U.S. Appl. No. 12/512,751, non-final office action dated May 24, 2013.

Matthew P. Lietzke, Eric Edward Dudkowski, Timothy Humphrey, Howard Locker, Jeffrey E. Skinner, Adam Miles Smith, Aaron Michael Stewart, Russell Speight VanBlon, "Emulating Fundamental Forces of Physics on a Virtual, Touchable Object" related U.S. Appl. No. 12/512,751, applicants response to non-final office action filed Jul. 3, 2013.

\* cited by examiner

FINGER TOUCH GESTURE FOR JOINING AND UNJOINING DISCRETE TOUCH OBJECTS

BACKGROUND OF THE INVENTION

1. Technical Field

The present invention relates to an approach for controlling a computer using touch sensitive tiles. More particularly, the present invention relates to an approach for providing a tile environment in conjunction with a traditional desktop environment.

2. Description of the Related Art

Computers are increasingly using touch-enabled screens for user interaction. The screen serves as both a traditional monitor as well as an input device. Objects displayed on the touch-enabled display screen can be moved around the screen by various user gestures, such as drag, flick, and spin. One challenge of traditional user interfaces is that each object is treated as a discrete object with no association between objects shown on the user interface screen. The lack of association between objects makes it difficult for the user to visually understand or recognize relationships between objects. Furthermore, as discrete objects can be located throughout the touch-enabled display screen, it is often difficult to locate an object even if a related object is located. Finally, to act on discrete objects, each of the objects is acted upon (e.g., in order to move or launch the objects) making it more time consuming for users to act on a set of related objects.

SUMMARY

An approach is provided to join graphical user interface objects into a group. A request is received at a touch-enabled display screen to join a first graphical user interface object with a second graphical user interface object. The request is from a user of the system. The first and second graphical user interface objects are then associated with each other. The first and second graphical user interface objects are displayed on the touch-enabled display screen adjacent to each other and a visual indicator is also displayed near the objects that indicates that the objects have been joined in a group.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
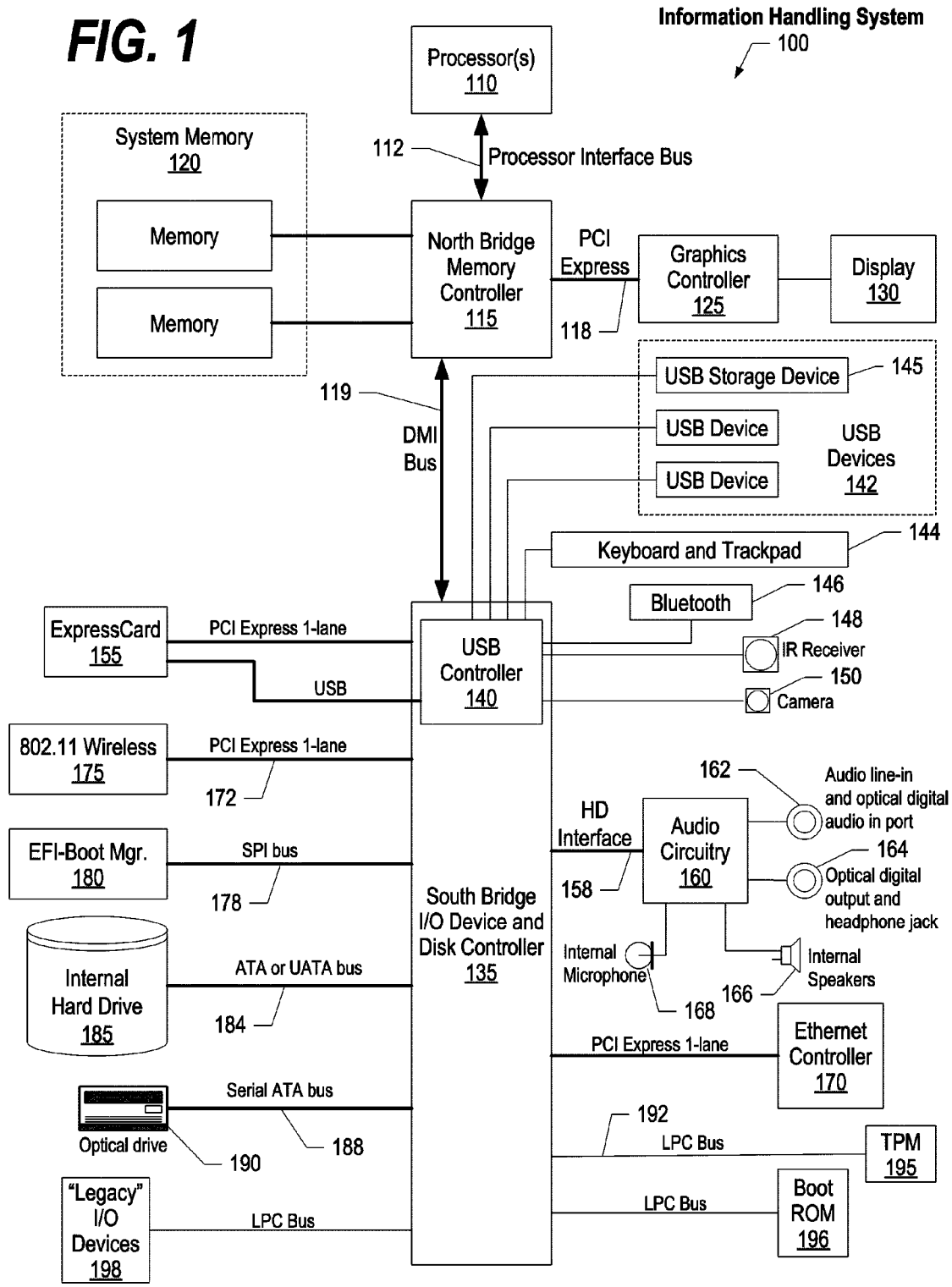
FIG. 1 is a block diagram of a data processing system in which the methods described herein can be implemented.
Figure 2:
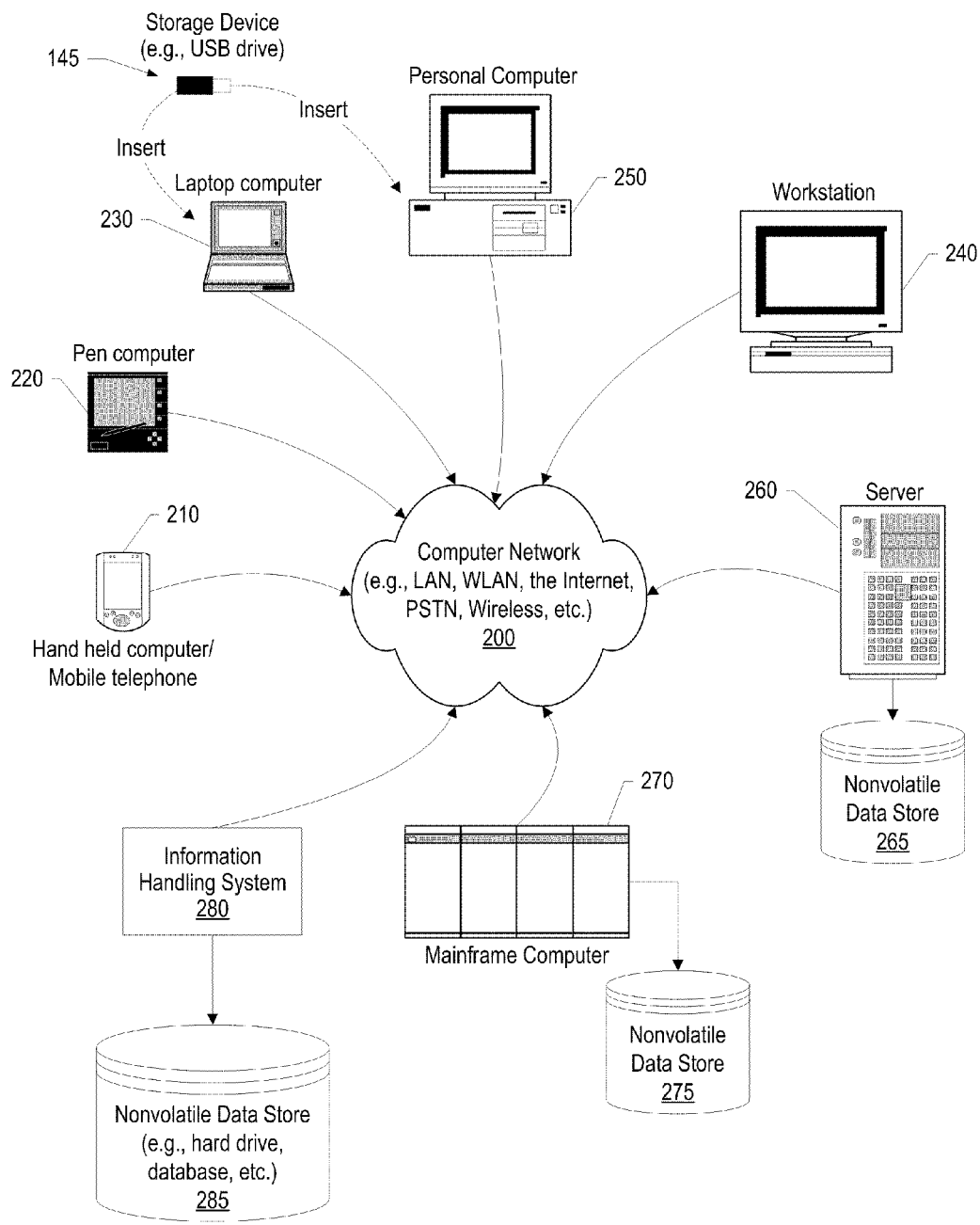
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
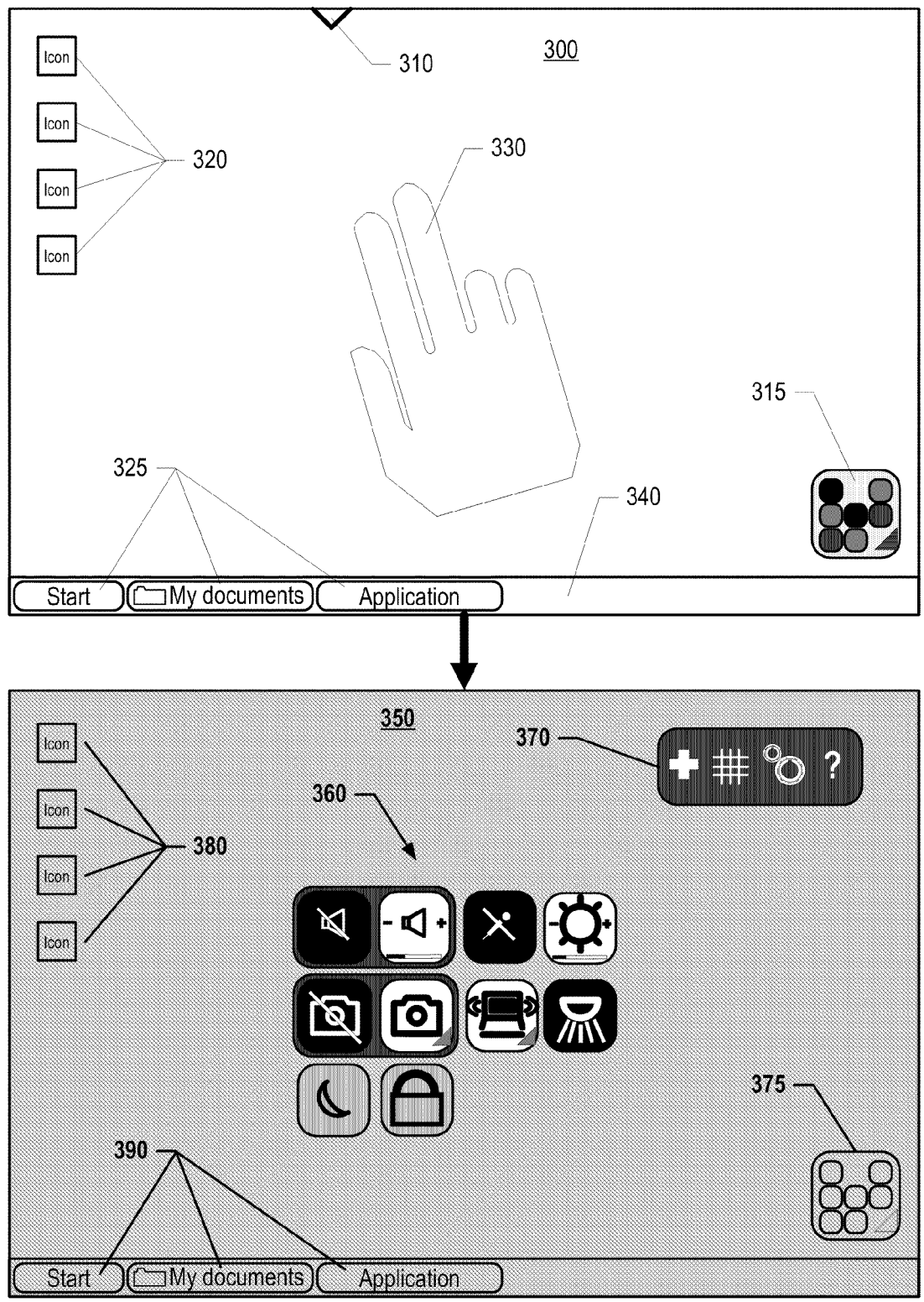
FIG. 3 is a diagram showing invocation of a tiles environment with a double-finger tap on the desktop display.

FIG. 3 is a diagram showing invocation of a tiles environment with a double-finger tap on the desktop display. Desktop environment 300 is a style of graphic user interface (GUI). The desktop environment, when invoked, assists the user in accessing various features, such as those corresponding to icons 320. When one of icons 320 is selected (e.g., using a pointing device), the corresponding application is launched. In addition, taskbar 340 lists open applications and a start icon (325) that can be selected in order to switch to a currently opened application or, in the case of the start icon, open a menu (or series of menus) allowing the user to perform system functions or open other applications (e.g., applications not listed in icons 320 and not already opened, etc.). Desktop environment 300 is more suited to a pointing device, such as a mouse, and is not as well suited to touch input using a user's finger for input. This is because the size of the input icons (e.g., 320 and 325) are generally too small to be easily touched and distinguished by a larger object, such as fingers 330. Various ways are available to invoke the tiles environment mode. In one embodiment, the user touches (taps) watermark 310 with finger(s) 330. In another environment, the user touches (taps) tiles mode gadget GUI 315 with finger(s) 330, and in a third environment, the user performs a tap gesture on desktop area 300 using finger(s) 330. A tap gesture can be configured to be a "double-finger double-tap" where the user uses two fingers (330) to double-tap desktop 300. When a gesture is received at desktop environment 300 requesting the tiles environment mode, then tiles environment 350 is displayed.

In one embodiment, tiles environment 350 is an overlay on top of desktop environment 300 so that the items within tiles environment 350 are on top of (overlay) the items seen in desktop environment 300. In this embodiment, the items that were seen in desktop environment 300 are still visible, however in tiles environment 350 such desktop items are inactive so that such items are not inadvertently activated while using the tiles environment (see inactive desktop icons 380, inactive toolbar items 390, and inactive icon 375). When the tiles environment is activated, the items that comprise the tiles environment are visible. These items include tiles 360 and tiles toolbar 370. Tiles 360 are larger than traditional icons and are configured to be easily manipulated by the user using a finger on a touch-screen display. For example, if the computer system is a tablet computer system with an optional keyboard, the user can enter tiles mode when the keyboard is inaccessible.

Figure 4:
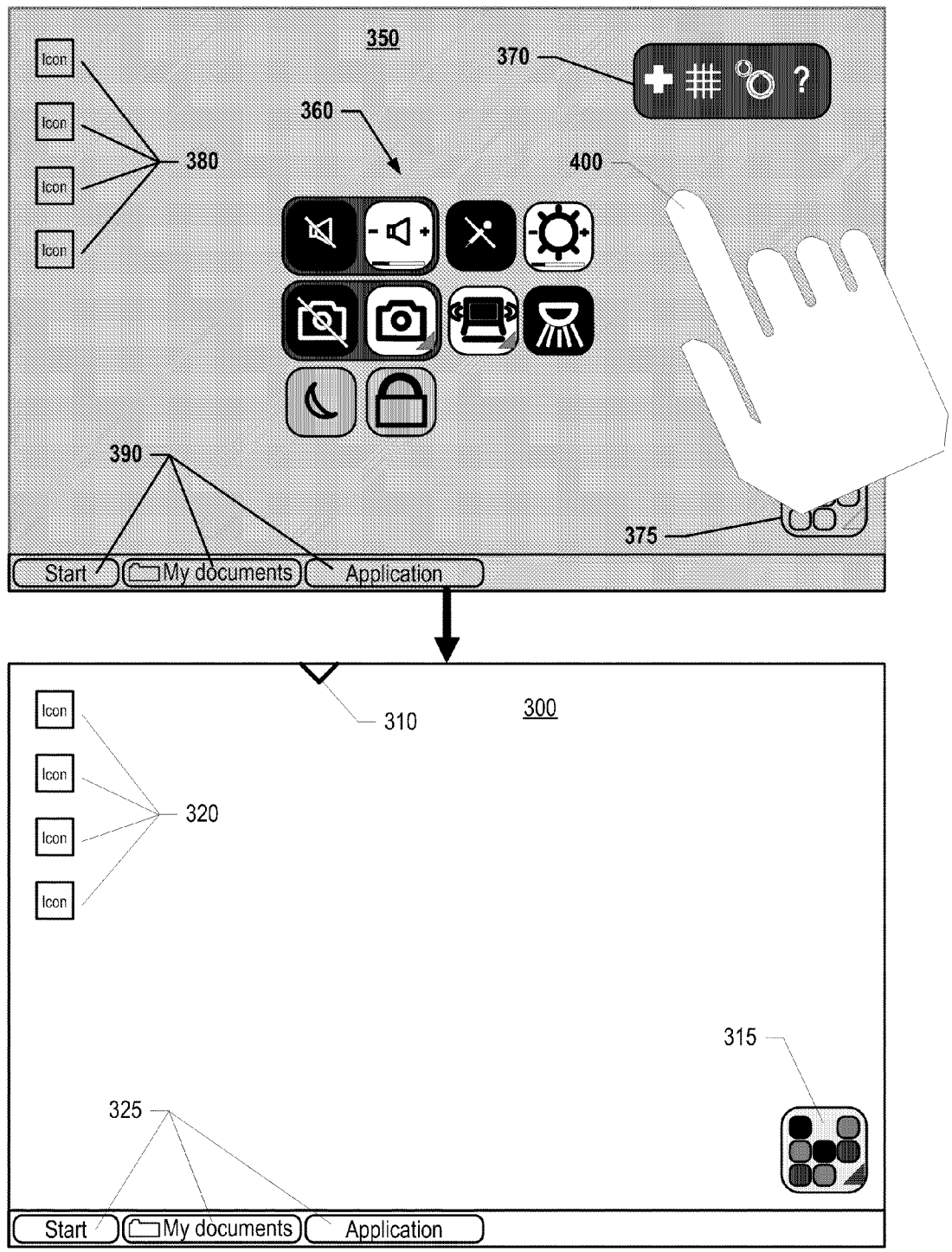
FIG. 4 is a diagram showing exiting of the tiles environment with a single-finger tap on the tiles environment display.

FIG. 4 is a diagram showing exiting of the tiles environment with a single-finger tap on the tiles environment display. In one embodiment, the user (400) taps (e.g., double-tap) somewhere on the tiles environment display 350 away from an existing tile 360 or the tile toolbar 370. Different gestures (e.g., single-finger tap, double-finger taps or double-taps, etc.) can be configured. In addition, one of the tiles 360 can be configured as an "exit" tile so that, when selected, the system will exit tiles mode 350 and re-enter desktop environment 300.

Figure 5:
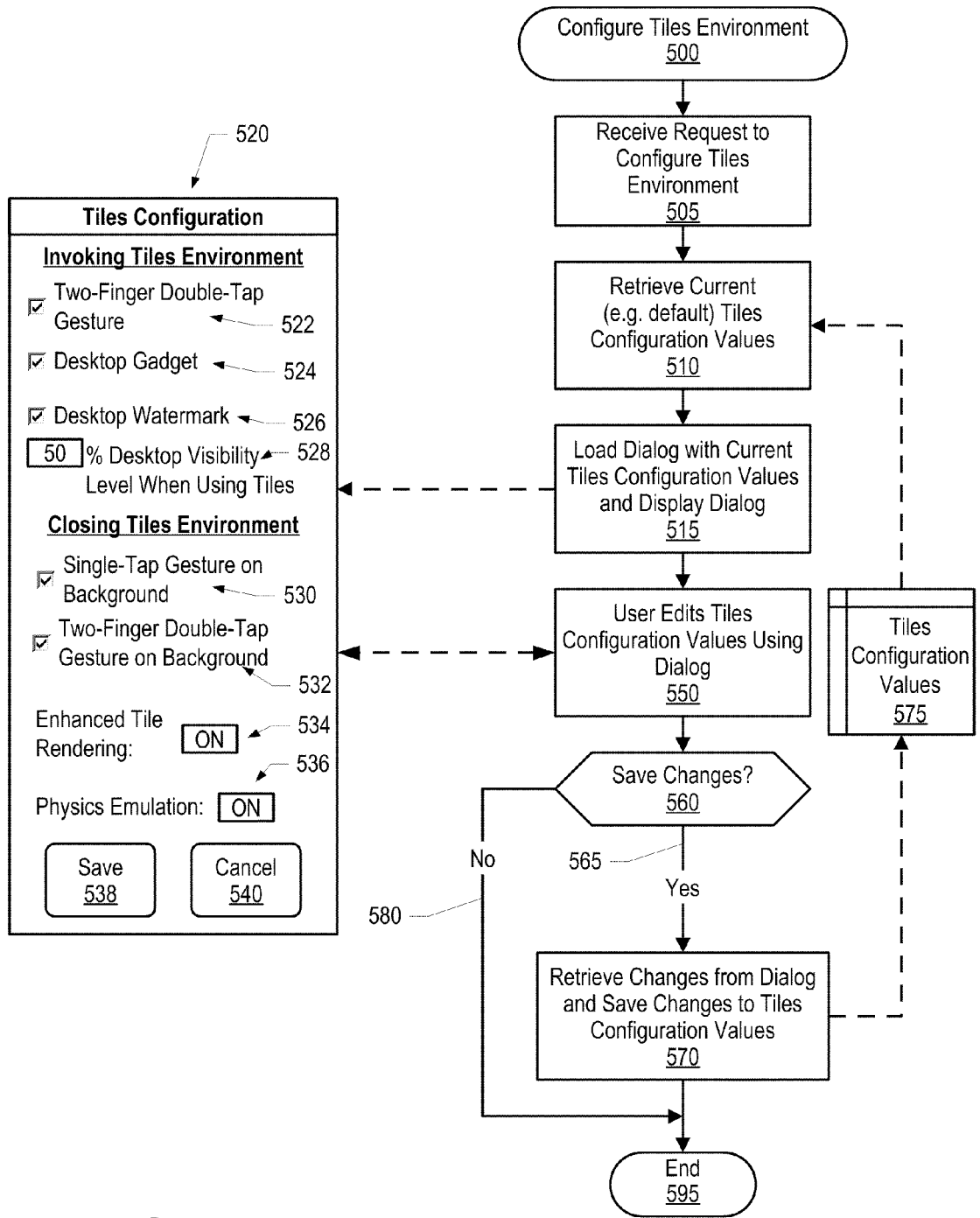
FIG. 5 is a flowchart showing steps used in configuring the tiles environment.

FIG. 5 is a flowchart showing steps used in configuring the tiles environment. Processing commences at 500 whereupon, at step 505, the system receives a request to configure the tiles environment. In one embodiment, one of the tiles shown in FIG. 3 within tiles toolbar 370, such as the plus sign "+" tile, is used to activate the processing shown in FIG. 5. In addition, standard non-tiles entry points would be available (e.g., control panel dialog, etc.) to configure the tiles environment. At step 510, the current (or default) tiles configuration values are retrieved from tiles configuration values memory area 575. At step 515, dialog 520 is loaded with the current tiles configuration values and the dialog is displayed to the user.

As can be seen, tiles configuration dialog includes sections for invoking (e.g. starting) the tiles environment, closing (e.g., ending) the tiles environment, as well as rendering and emulation options. Three options are shown for invoking the tiles environment—two-finger double tap gesture (checkbox 522), a desktop gadget graphical user interface (checkbox 524), and a desktop watermark (checkbox 526). Each of these gesture items was previously introduced in FIG. 3 (see double-finger tap gesture 330, watermark 310, and gadget 315 for examples). In addition, textbox 528 provides for a desktop visibility percentage when the tiles environment is invoked. The visibility percentage controls how dimmed the desktop environment items are when the tiles environment is invoked. A zero-percent visibility level would completely black-out the desktop mode items with the tiles environment overlay, while a one-hundred-percent visibility level would overlay the desktop environment items without dimming the items. A fifty-percent visibility level (shown in the example) would dim the items but would still allow the user to see the underlying desktop environment items. As will be appreciated by those skilled in the art, additional gestures could be developed to invoke the tiles environment from the desktop environment.

When closing the tiles environment, two gestures are shown in dialog 520—single tap gesture on the background area (checkbox 530) and a two-finger double-tap gesture on the background area (checkbox 532). As will be appreciated by those skilled in the art, additional gestures could be developed to invoke the tiles environment from the desktop environment, such as an additional tile that, when selected, exits the tiles environment.

Enhanced tile rendering (input box 534) controls whether the tiles displayed in tiles environment are rendered using enhanced techniques. Enhanced rendering techniques are described in further detail below (see, e.g., FIG. 16) and includes techniques such as rendering tiles in three dimensional (3-D) animation, providing additional animation (e.g., shaking or movement of tiles), tile sizes (e.g., some tiles being larger than others). Similarly, physics emulation (input box 536) provides for enhanced rendering feedback, such as moving larger (heavier) tiles more slowly than small tiles, providing magnetic- and gravitational-type attraction between tiles, an other physics properties. Physics properties can be applied when tiles are moved as well as when tiles are arranged so that some tiles have an affinity for one another and are therefore attracted to each other when the tiles are arranged, whereas other tiles are repelled from each other and are displayed in different regions of the tiles environment due to such repulsion forces.

At step 550, the user edits the tile configuration values using dialog 520. When the user is finished using configuration panel 520, he selects either save command button 538 or cancel command button 540. A determination is made as to whether the user requested to save the tile configuration changes made using configuration panel 520 (decision 560). If the user requested to save the changes, then decision 560 branches to "yes" branch 565 whereupon, at step 570, the changed tile configuration values are retrieved from configuration panel 520 and saved to tiles configuration memory area 575. On the other hand, if the user did not wish to save the changes, then decision 560 branches to "no" branch 580 bypassing step 570. Processing used to configure the tiles environment thereafter ends at 595.

Figure 6:
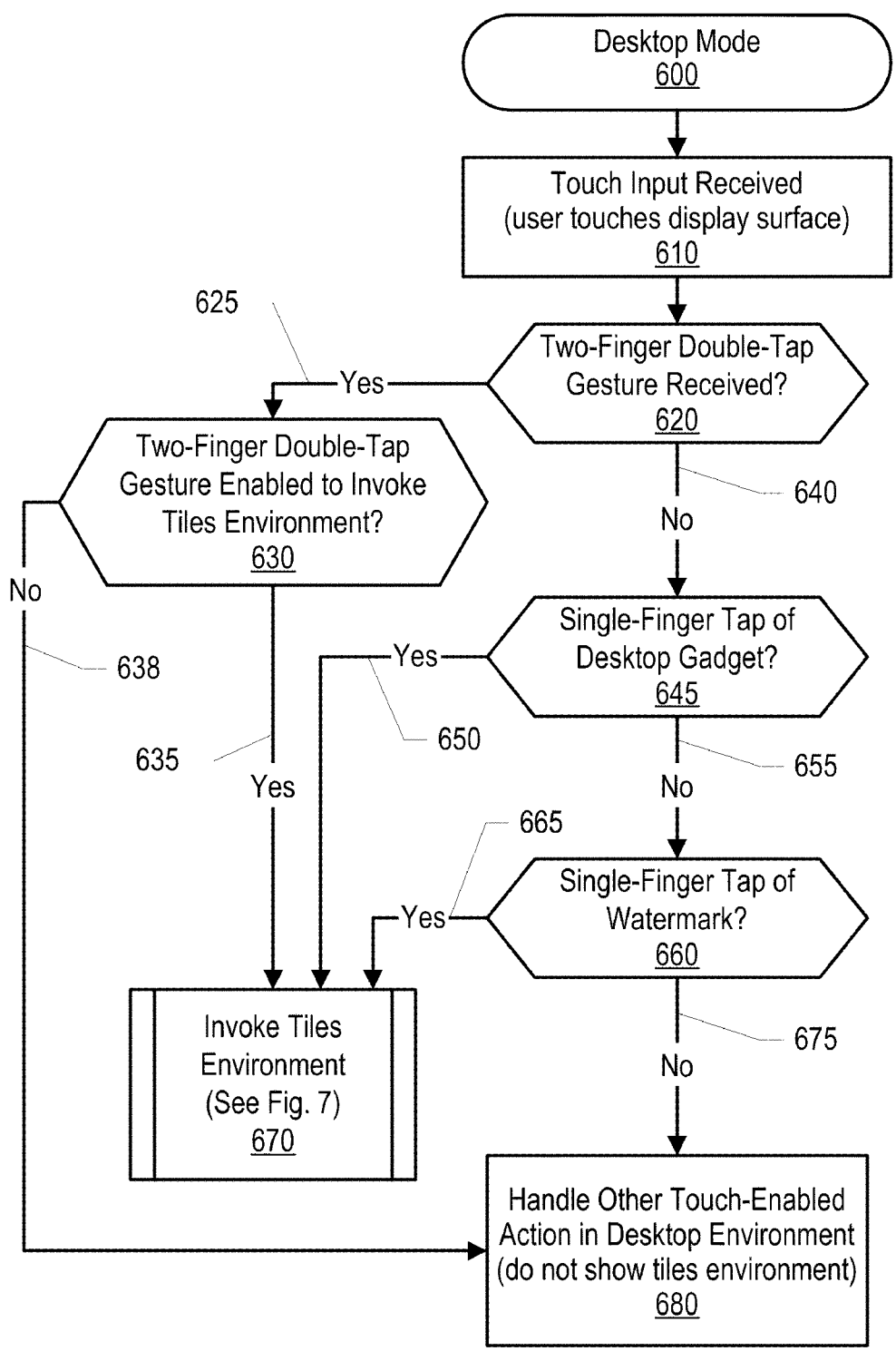
FIG. 6 is a flowchart showing steps taken to invoke the tiles environment from the desktop environment.

FIG. 6 is a flowchart showing steps taken to invoke the tiles environment from the desktop environment. Processing commences at 600 while the system is in the desktop environment. At step 610, touch input is received at the system. This typically occurs when the user touches the display surface with their finger(s). A determination is made as to whether a two-finger double-tap gesture was received (decision 620). A two-finger double-tap occurs when the user uses two fingers together to double tap the display surface. If a two-finger double-tap gesture was received at the display surface, then decision 620 branches to "yes" branch 625 whereupon a determination is made as to whether this gesture (two-finger double-tap) has been enabled (e.g., through user configuration shown in FIG. 5) to invoke the tiles environment (decision 630). If the two-finger double-tap gesture has been enabled to invoke the tiles environment, then decision 630 branches to "yes" branch 635 whereupon, at predefined process 670 processing invokes the tiles environment (see FIG. 7 and corresponding text for processing details). On the other hand, if the two-finger double-tap gesture has not been enabled to invoke the tiles environment, then decision 630 branches to "no" branch 638 bypassing predefined process 670.

Returning to decision 620, if a two-finger double-tap gesture was not received at the display device, then decision 620 branches to "no" branch 640. A determination is made as to whether a single-finger tap of a desktop gadget (e.g., gadget 315 shown in FIG. 3) that corresponds to the tiles environment was received (decision 645). If selection of a desktop gadget corresponding to the tiles environment was received, then decision 645 branches to "yes" branch 650 whereupon, at predefined process 670 processing invokes the tiles environment (see FIG. 7 and corresponding text for processing details). On the other hand, if the user did not activate a desktop gadget corresponding to the tiles environment, then decision 645 branches to "no" branch 655 whereupon a determination is made as to whether a single-finger tap of a watermark that corresponds to the tiles environment was received at the display (decision 660, see watermark 310 on FIG. 3 for an example of a watermark that corresponds to the tiles environment). If a single-finger selection of a watermark corresponding to the tiles environment was received at the display, then decision 660 branches to "yes" branch 665 whereupon predefined process 670 is performed to invoke the tiles environment. On the other hand, if a single-finger tap of a watermark corresponding to the tiles environment was not received, then decision 660 branches to "no" branch 675. If the tiles environment is not being invoked, at step 680, another touch-enabled task is performed in the desktop environment and the tiles environment is not invoked (e.g., selection of a desktop environment icon, etc.). Note that other actions can be programmed to invoke the tiles environment, such as through a Start menu item, through another icon, or the like.

Figure 7:
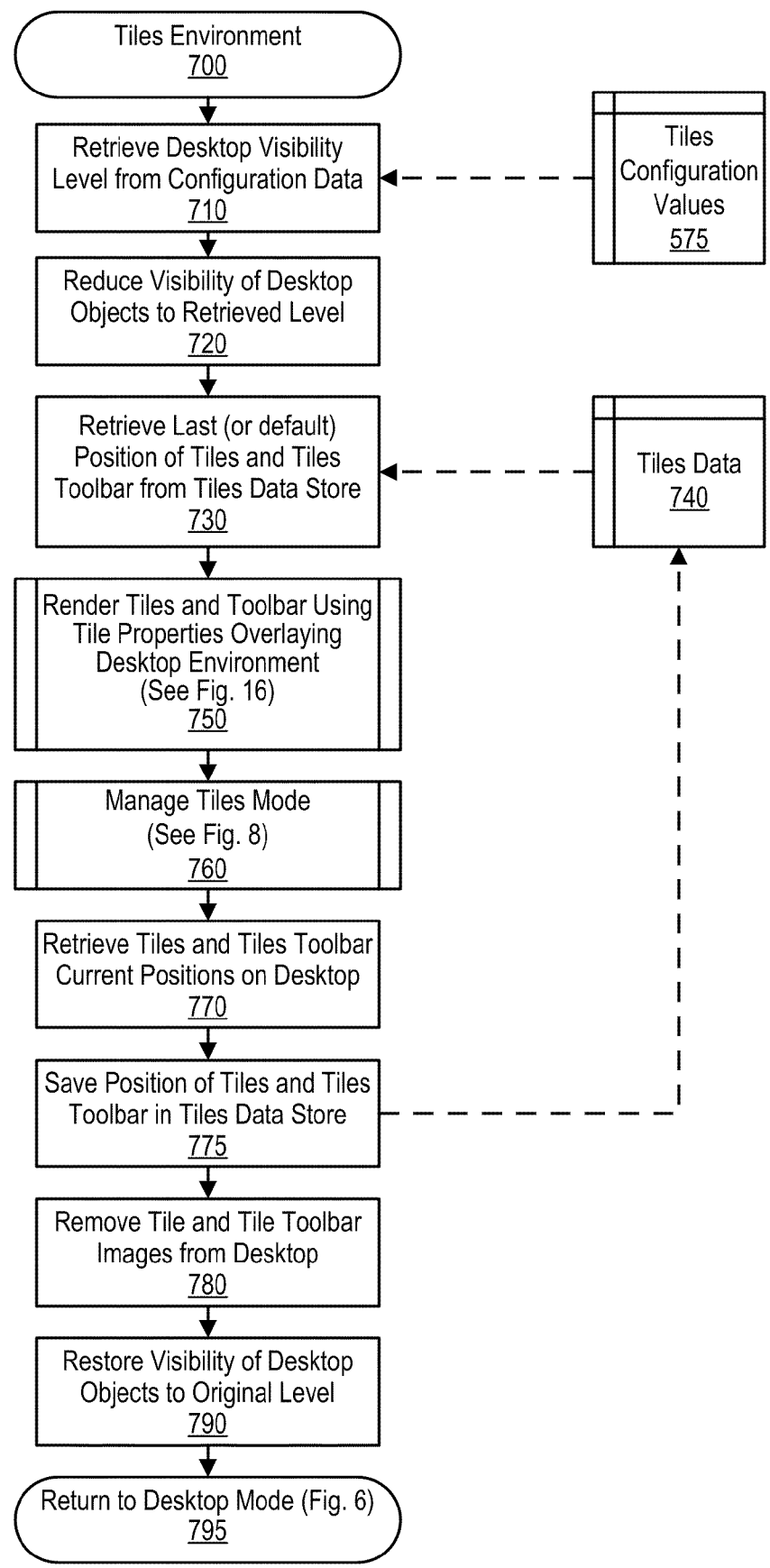
FIG. 7 is a high-level flowchart showing steps performed while the user is in the tiles environment.

FIG. 7 is a high-level flowchart showing steps performed while the user is in the tiles environment. At step 710, processing receives the desktop visibility level from tiles configuration values memory area 575. In one embodiment, the tiles environment is an overlay on top of the desktop environment. In this embodiment, the underlying desktop environment can still be viewed when the tiles environment is displayed. The visibility level controls how dimly the underlying desktop environment is displayed. If the visibility level is set at one-hundred percent (100%), then the visibility level of the desktop environment is not reduced so the tiles environment is displayed at the same visibility as the underlying desktop environment which may cause some difficulty distinguishing between desktop environment items (icons, etc.) and the tiles environment items (tiles, tile toolbar, etc.). Conversely, if the visibility level of the desktop environment is set to zero percent (0%), then the underlying desktop environment is blacked out (not visible). The user can set the visibility level from zero to one-hundred percent (0%-100%). At step 720, the visibility level of the desktop environment is set to the user-defined level. In one embodiment, the underlying desktop environment is disabled so that, even while the desktop environment items may be visible, if selected they do not perform any functions.

At step 730, the last position of the tiles and the tiles toolbar are retrieved from tiles data memory area 740. If the tiles environment has not yet been invoked, then default positions of the tiles and tile toolbar are retrieved at step 730. Predefined process 750 is performed to render the tiles and tiles toolbar using various tile properties (see FIG. 16 and corresponding text for processing details). In one embodiment, the tiles objects (tiles, tile toolbar, etc.) overlay the desktop environment. After the tiles environment has been invoked, the system monitors and manages user actions taken while in the tiles environment (predefined process 760, see FIG. 8 and corresponding text for processing details).

When the user exits the tiles environment, at step 770, the current positions of the tiles and tiles toolbar are retrieved and, at step 775, the position of the tiles and tiles toolbar are saved to tiles data memory area 740 so that the same positions can be reloaded the next time the user enters the tiles environment. At step 780, the tiles environment items are removed from the display screen (e.g., tiles, tiles toolbar, etc.). At step 790, the visibility of the desktop environment is restored back to one-hundred percent (100%). In addition, the desktop environment objects are re-enabled so that the user can select the desktop environment objects. Processing then returns back to desktop mode at 795 (see FIG. 6 and corresponding text for processing details).

Figure 8:
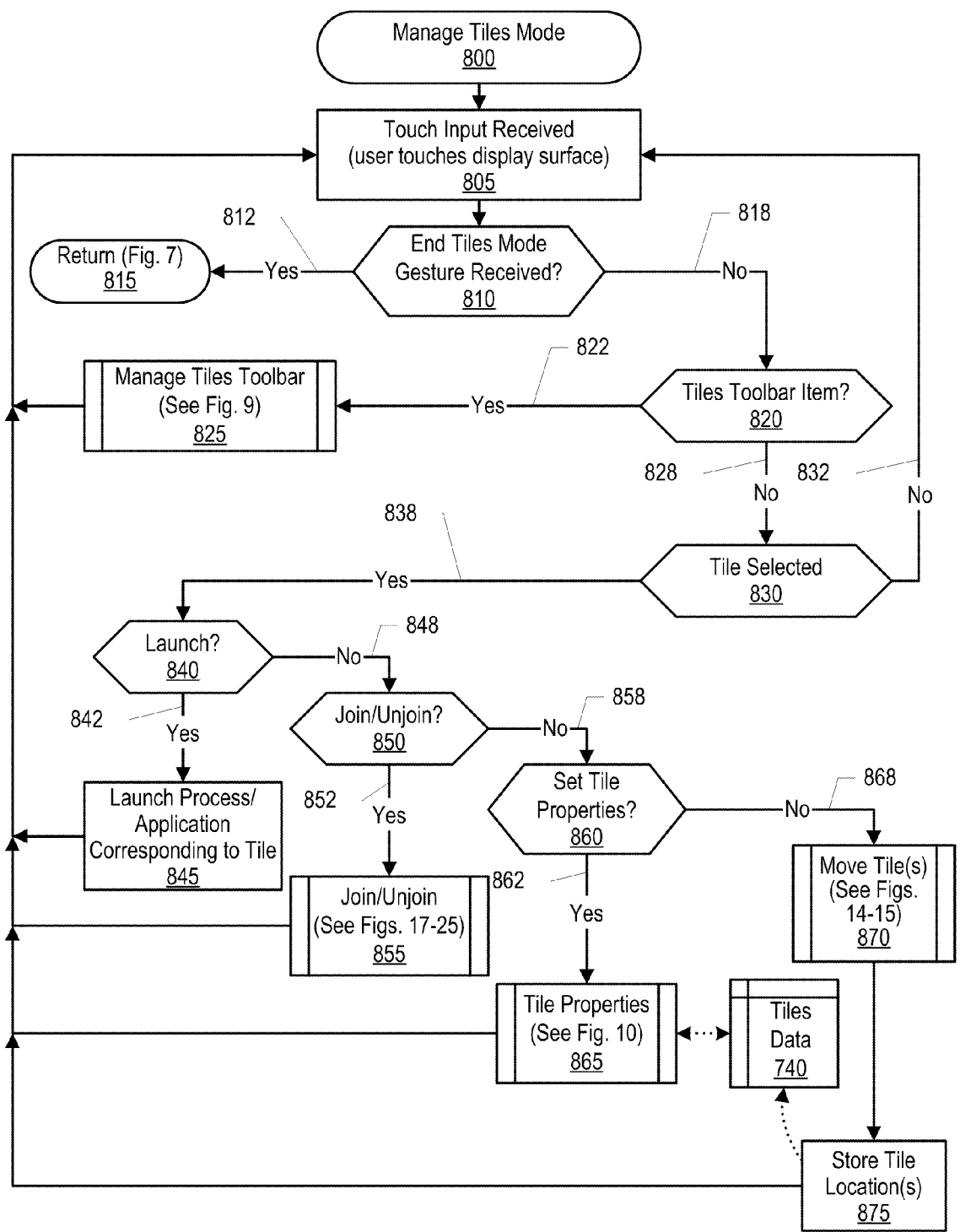
FIG. 8 is a flowchart showing steps taken to manage processes while in the tiles environment.

FIG. 8 is a flowchart showing steps taken to manage processes while in the tiles environment. Processing commences at 800 whereupon, at step 805, touch-enabled input is received at the display device (e.g., the user touching the display screen with one or more fingers). A determination is made as to whether a gesture was received to exit the tiles environment (decision 810). If a gesture was received to exit the tiles environment, then decision 810 branches to "yes" branch 812 whereupon processing returns to the calling routine at 815 (see FIG. 7 and corresponding text for processing details). On the other hand, if a gesture to exit the tiles environment was not received, then decision 810 branches to "no" branch 818.

A determination is made as to whether the touch input that was received corresponds to a tiles toolbar item (decision 820). If a tiles toolbar item was selected, then decision 820 branches to "yes" branch 822 whereupon, at predefined process 825, the tiles toolbar selection is handled (see FIG. 9 and corresponding text for processing details). On the other hand, if a tiles toolbar item was not selected, then decision 820 branches to "no" branch 828 whereupon a determination is made as to whether a tile was selected (decision 830). If a tile was not selected, then decision 830 branches to "no" branch 832 which loops back to receive the next touch-input and process it accordingly. On the other hand, if a tile was selected, then decision 830 branches to "yes" branch 838 in order to process the tile selection.

A determination is made as to whether a gesture was received to launch (e.g., invoke) a process or program corresponding to the selected tile (decision 840). In one embodiment, a single-finger tap or double-tap can be configured to launch the process. If a launch gesture was received, then at step 845, the process corresponding to the selected tile is executed and processing loops back to receive the next touch-input and process it accordingly.

If the tile selection did not include a launch gesture, then decision 840 branches to "no" branch 848 whereupon a determination is made as to whether a gesture was received to join (or unjoin) the tile to (or from) other tile(s) (decision 850). If a join or unjoin gesture was received, decision 850 branches to "yes" branch 852 whereupon, at predefined process 855, the tile is joined or unjoined to/from other tile(s) (see FIGS. 17-25 and corresponding text for processing details as well as for details regarding particular gestures used to join and unjoin tiles. Processing then loops back to receive the next touch-input and process it accordingly.

On the other hand, if a join or unjoin gesture was not received, then decision 850 branches to "no" branch 858 whereupon a determination is made as to whether a gesture was received to set tile properties (decision 860). If a single-click is configured as a launch gesture, then a double-click could be configured as a tile properties gesture, and vise-versa. If a gesture is received to set tile properties, then decision 860 branches to "yes" branch 862 whereupon, at predefined process 865, the set tile properties routine is performed (see FIG. 10 and corresponding text for processing details). When tile properties are set, the tile properties are stored in tiles data memory area 740. Processing then loops back to receive the next touch-input and process it accordingly.

Figure 14:
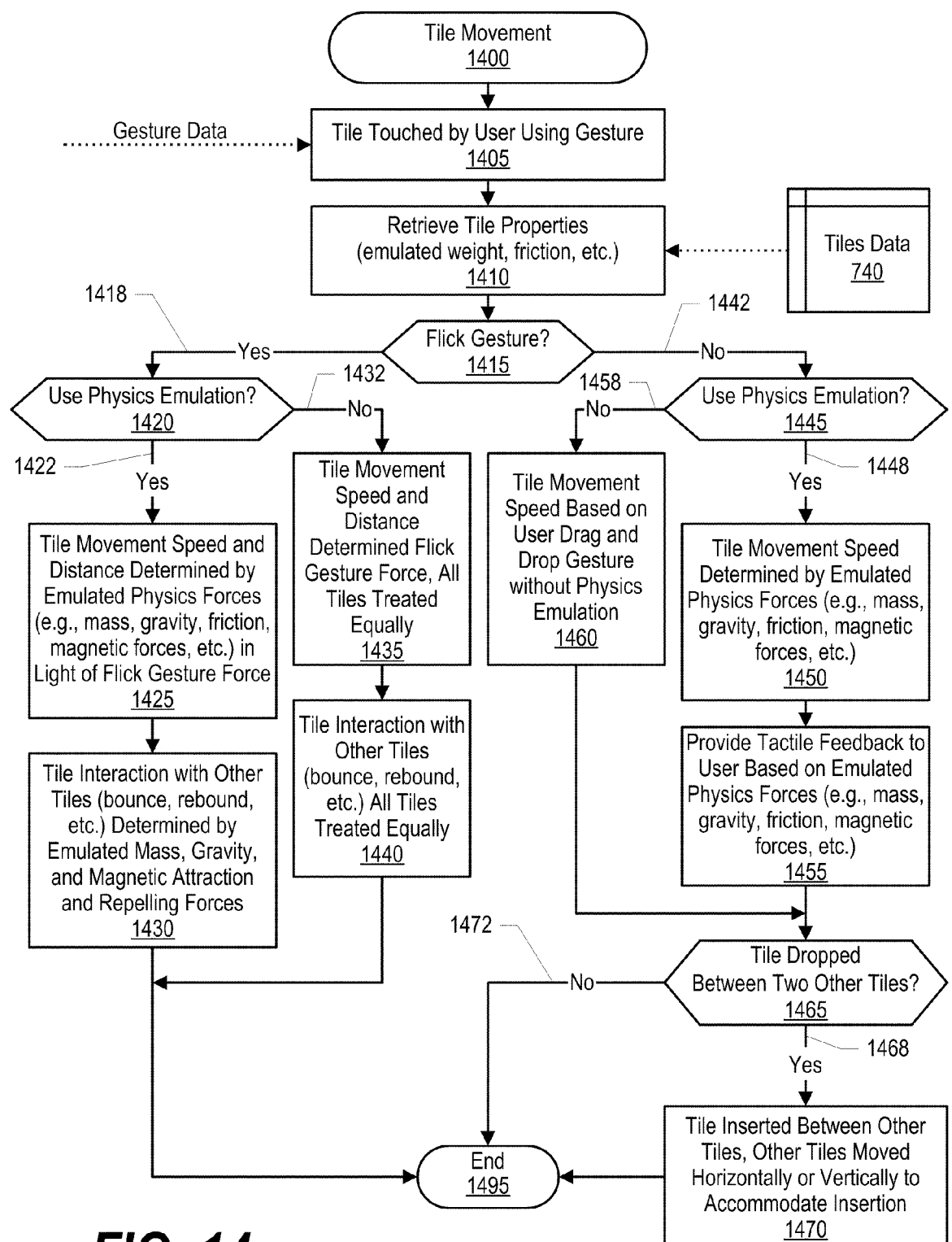
FIG. 14 is a flowchart showing steps to handle movement of tiles within the tiles environment display.
Figure 15:
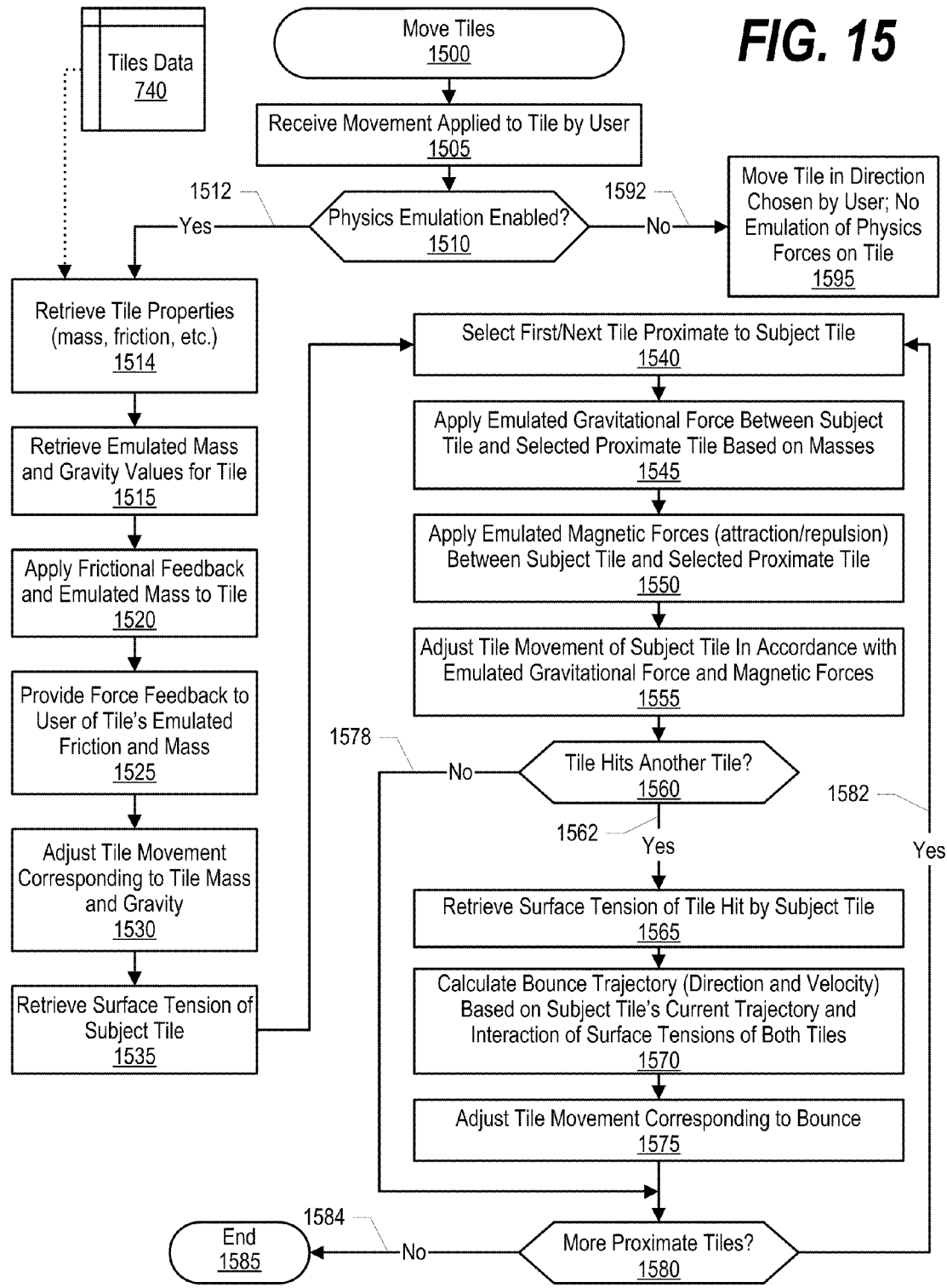
FIG. 15 is a second flowchart showing steps to handle movement of tiles within the tiles environment display.

Returning to decision 860, if the gesture received is to move tile(s), then decision 860 branches to "no" branch 868 whereupon, at predefined process 870, processes used to manage tile movement are performed (see FIGS. 14 and 15 and corresponding text for processing details). At step 875, the tile locations are stored in tile data memory area 740. Processing then loops back to receive the next touch-input and process it accordingly.

Figure 9:
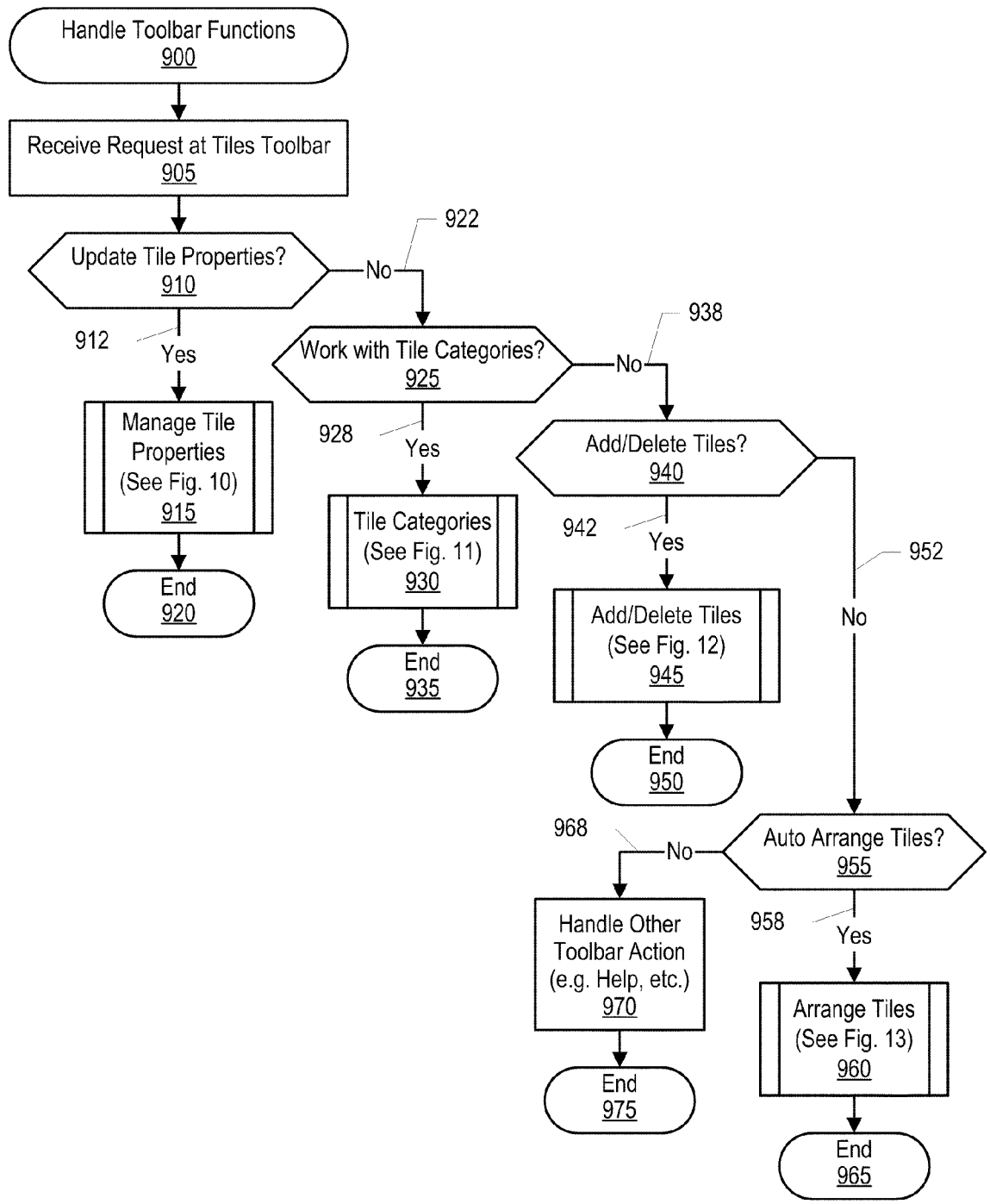
FIG. 9 is a flowchart showing steps taken to handle toolbar functions available while the use is in the tiles environment.

FIG. 9 is a flowchart showing steps taken to handle toolbar functions available while the use is in the tiles environment. Processing commences at 900 whereupon, at step 905, a touch-enabled request is received at the tiles toolbar. A determination is made as to whether the request is to update tile properties from the tiles toolbar (decision 910). If the request is to update tile properties, then decision 910 branches to "yes" branch 912 whereupon, at predefined process 915, the tile properties management routine is performed (see FIG. 10 and corresponding text for processing details) and processing ends at 920.

On the other hand, if update tile properties has not been requested, then decision 910 branches to "no" branch 922 whereupon a determination is made as to whether the request is to work with tile categories (decision 925). Tile categories enable the user to categorize tiles such as tiles that perform system functions, those that perform office functions, and those that perform multimedia functions. As will be explained in greater detail, categories can be assigned properties so that, for example, tiles that perform system functions can be more easily distinguished from those that perform office or multimedia functions. If the user has requested to work with tile categories, then decision 925 branches to "yes" branch 928 whereupon, at predefined process 930, the tiles categories process is performed (see FIG. 11 and corresponding text for processing details) and processing ends at 935.

Returning to decision 925, if the request is not to work with tile categories, then decision 925 branches to "no" branch 938 whereupon a determination is made as to whether the request is to add or delete tiles (decision 940). If the request is to add or delete tiles, then decision 940 branches to "yes" branch 942 whereupon, at predefined process 945, the add/delete tiles process is performed (see FIG. 12 and corresponding text for processing details) and processing ends at 950.

Returning to decision 940, if the request was not to add or delete tiles, then decision 940 branches to "no" branch 952 whereupon a determination is made as to whether the request is to automatically arrange the tiles (decision 955). If the request is to automatically arrange the tiles, then decision 955 branches to "yes" branch 958 whereupon, at predefined process 960, the tiles are automatically arranged on the display. In one embodiment, the automatic arrangement of tiles is based on physics properties assigned to the tiles and the tile categories, such as a tiles attraction to or repulsion from other tiles displayed in the tiles environment. Processing thereafter ends at 965. On the other hand, if the request is not to automatically arrange tiles, then decision 955 branches to "no" branch 968 whereupon, at step 970, some other toolbar function is performed, such as a request for help, etc. after which processing ends at 975.

Figure 10:
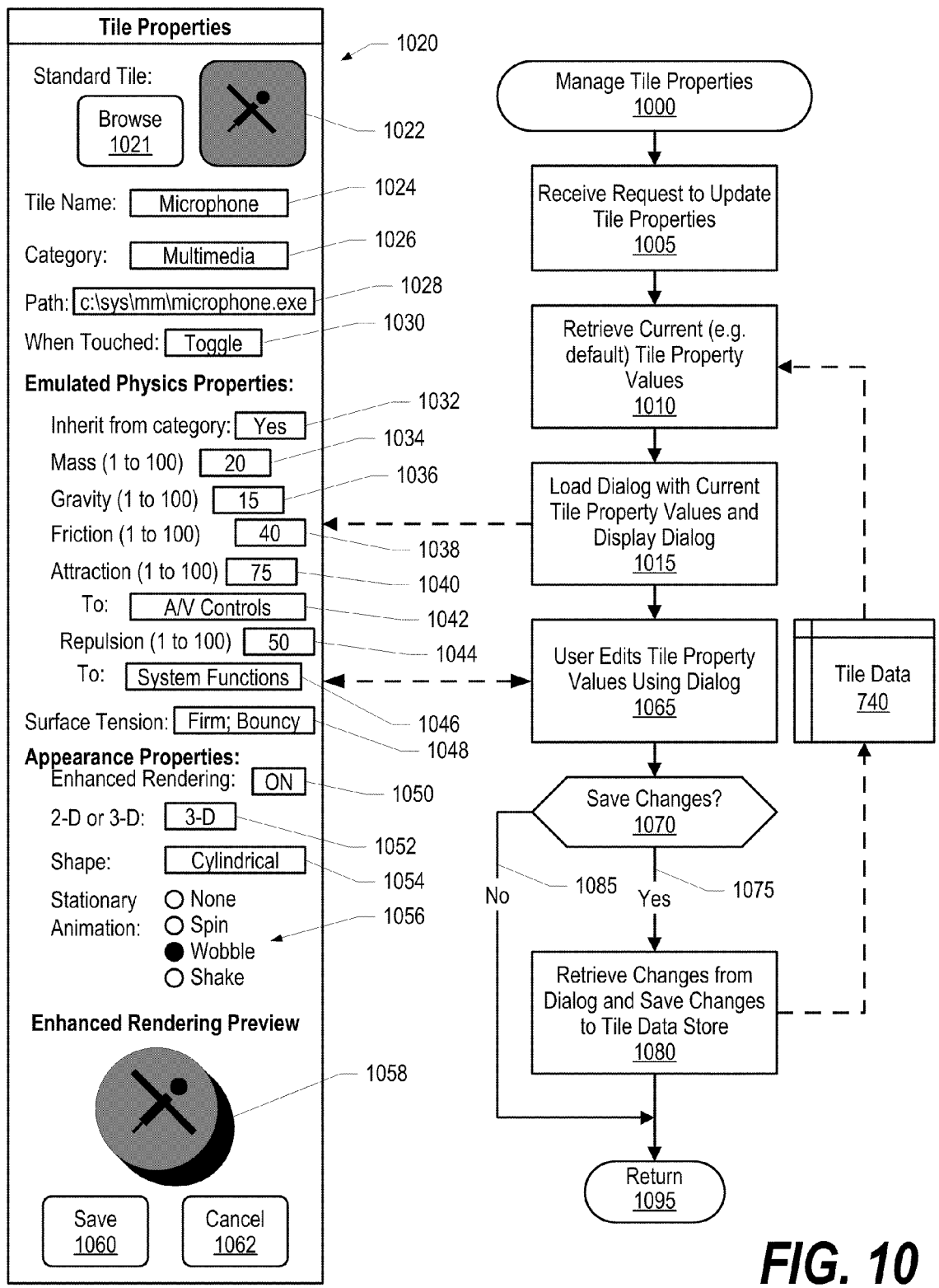
FIG. 10 is a flowchart showing steps to manage tile properties.

FIG. 10 is a flowchart showing steps to manage tile properties. Processing commences at 1000 whereupon, at step 1005, a request is received to update tile properties. At step 1010, the current (or default) tile property values are retrieved for the selected tile from tile data memory area 740. At step 1015, tile properties dialog 1020 is loaded with the retrieved tile property values. Command button 1021 is used to browse available tile images in order to select a different tile image for the tile. Tile image 1022 shows the current tile image that has been selected for this tile. Textbox 1024 allows the user to edit the name of the tile. In this case, the name of the tile is "microphone" and the tile image is that of a microphone. Textbox 1026 is used to categorize the tile. In this case, the "microphone" tile has been categorized to be one of the tiles in the "multimedia" category. Textbox 1028 provides a path to a corresponding process that corresponds to the tile. In this case, the executable "c:∛sys\mm\microphone.exe" corresponds to the microphone tile. Textbox 1030 provides an action parameter that is performed when the tile is touched by the user. In this case, when the tile is touched, the tile toggles (e.g., turns the microphone "off" and "on"). In one embodiment, the "toggle" parameter is provided to the executable when the tile is touched. Another example of an action to take when a tile is touched would include "launch" so that the program specified by the path is executed when the tile is touched.

Emulated physics properties are set to control various physics properties employed by a tile, especially when the tile is moved on the display screen. These emulated physics properties include yes/no control 1032 that determines whether the tile inherits physics properties from its category. In the example, the value is "Yes" so that the microphone tile will inherit physics emulation properties from the multimedia category. Textbox 1034 provides for an input of an emulated mass, in this case the mass is set to 20 on a scale of 1 to 100. In one embodiment, physics emulation can be turned on so that tiles interact with each other as well as other items in the tiles environment based on their relative mass to each other. Likewise, textbox 1036 is used to provide an emulated gravity for the tile. In this case, the emulated gravity of the microphone tile is set to 15 on a range of 1 to 100. Emulated friction (textbox 1038) controls how much resistance is encountered when moving the tile across the tiles environment display. More emulated friction would make moving the tile feel more rough, or difficult, while less emulated friction would make moving the tile feel smoother or even slippery. Textboxes 1040 and 1042 control how attracted the tile is to another category of tiles. In the example, the microphone tile is attracted to audio/visual tiles. Similarly, textboxes 1044 and 1046 control how repelled the tile is to another category of tiles. Here, the microphone tile is repelled from system function tiles.

Textbox 1048 provides a surface tension property. In the example, the surface tension of the multimedia tile is set as being firm and bouncy. Other examples of surface tension could be hard like steel, squishy like a marshmallow, and springy like a rubber band.

Appearance properties provide various enhanced rendering properties. These include whether enhanced rendering is on or off (control 1050), whether the tile is displayed in two-dimensional (2-D) or three-dimensional (3-D) form (control 1052). Other enhanced rendering properties include the shape of the tile (control 1054). In the example, the multimedia tile's enhanced shape is a 3-D cylinder. Other shapes could include boxes, spheres, pyramids, and the like. Stationary animation control 1056 provides for animation that is used when the tile is displayed. Some examples of stationary animation include "spin" where the tile appears to spin in place, "wobble" where the tile appears to wobble back and forth, and "shake" where the tile appears to vibrate in all directions. Enhanced rendering preview 1058 provides a graphical preview of how the tile will appear when enhanced rendering is turned on. When the user is finished using tile properties dialog 1020, he presses save command button 1060 to save the edits and changes made on dialog 1020 and presses cancel command button 1062 to discard any such edits and changes.

At step 1065, the user edits the tile properties data as described above. When editing is finished, a determination is made as to whether the user requested that the changes be saved (decision 1070). If the user pressed save command button 1060, then decision 1070 branches to "yes" branch 1075 whereupon, at step 1080, the changes that the user made are retrieved from dialog 1020 and saved to tile data memory area 740. On the other hand, if the user pressed cancel command button 1062, then decision 1070 branches to "no" branch 1085 bypassing step 1080. Processing then returns to the calling routine at 1095.

Figure 11:
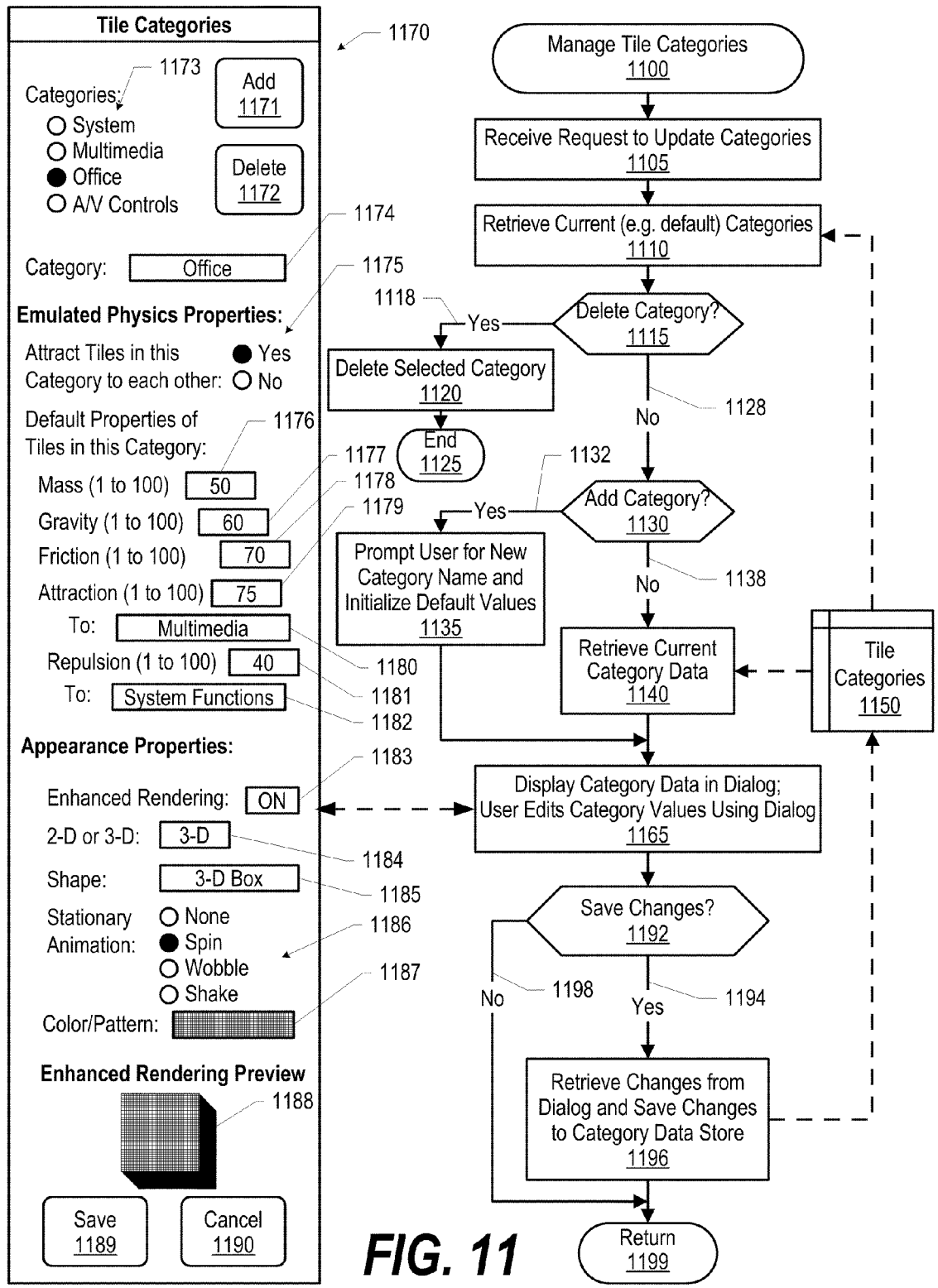
FIG. 11 is a flowchart showing steps to manage tile properties.

FIG. 11 is a flowchart showing steps to manage tile properties. Processing commences at 1100 whereupon, at step 1105, the system receives a request to update tile categories. At step 1110, the current (or default) categories are retrieved from tile categories memory area 1150. A determination is made as to whether the request is to delete an existing category (decision 1115). If the request is to delete an existing category, then decision 1115 branches to "yes" branch 1118 whereupon, at step 1120, the selected category is deleted from tile categories memory area 1150 and processing ends at 1125.

On the other hand, if the request is not to delete an existing category, then decision 1115 branches to "no" branch 1128 whereupon a determination is made as to whether the request is to add a new category (decision 1130). If the request is to add a new category, then decision 1130 branches to "yes" branch 1132 whereupon, at step 1135, the user is prompted for the new category name and default values are initialized for the new category. On the other hand, if the request is not to add a new category and is instead a request to modify an existing category, then decision 1130 branches to "no" branch 1138 whereupon, at step 1140, the current category data is retrieved from tile categories memory area 1150 for the category that the user wishes to edit.

At step 1165, tiles categories property dialog 1170 is displayed with the current (or default) category data. Add command button 1171 can be used to add a new tile category and delete command button 1172 can be used to delete an existing tile category. Categories list 1173 is a radio-button control that allows a user to select the category being edited. In the example shown, the categories include "System," "Multimedia," "Office," and "A/V Controls." Textbox 1174 allows the user to change the name of the current category. Radio button control 1175 indicates whether the tiles that are included in this category are attracted to each other. Default properties can be set that apply to any tile that is included in the category. These default properties include mass property 1176, gravity property 1177, friction property 1178, and the attraction and repulsion properties, 1179-1182. The category in the example is the "office" category. Attraction property 1180 indicates that, by default, tiles in the office category are attracted to tiles in the multimedia category. Likewise, repulsion property 1182 indicates that, by default, tiles in the office category are repulsed from tiles included in the system functions category.

Default appearance properties are provided and used as default properties for any tile in the category. The appearance properties include enhanced rendering control 1183 that determines whether, by default, enhanced rendering is used to render tiles in this category. In the example, enhanced rendering is turned ON. Another appearance property is 2-D/3-D control 1184 that determines whether, by default, tiles in this category are rendered in two-dimensions (2-D) or three-dimensions (3-D). Shape control 1185 is used to identify the default shape of the tiles. In the example, the shape of the tiles is a three-dimensional block. Stationary animation control 1186 is used to identify a default animation, if any, that is applied to tiles in the category. Some examples of stationary animation include "spin" where the tile appears to spin in place, "wobble" where the tile appears to wobble back and forth, and "shake" where the tile appears to vibrate in all directions. Color/pattern control 1187 controls the pattern and/or color that is used as a default for tiles in the category. Enhanced rendering preview 1188 provides a graphical preview of how the tile will appear when enhanced rendering is turned on. When the user is finished using tile properties dialog 1170, he presses save command button 1189 to save the edits and changes made on dialog 1170 and presses cancel command button 1190 to discard any such edits and changes.

When editing is finished, a determination is made as to whether the user requested that the changes be saved (decision 1192). If the user pressed save command button 1189, then decision 1192 branches to "yes" branch 1194 whereupon, at step 1196, the changes that the user made are retrieved from dialog 1170 and saved to tile categories memory area 1150. On the other hand, if the user pressed cancel command button 1190, then decision 1192 branches to "no" branch 1198 bypassing step 1196. Processing then returns to the calling routine at 1199.

Figure 12:
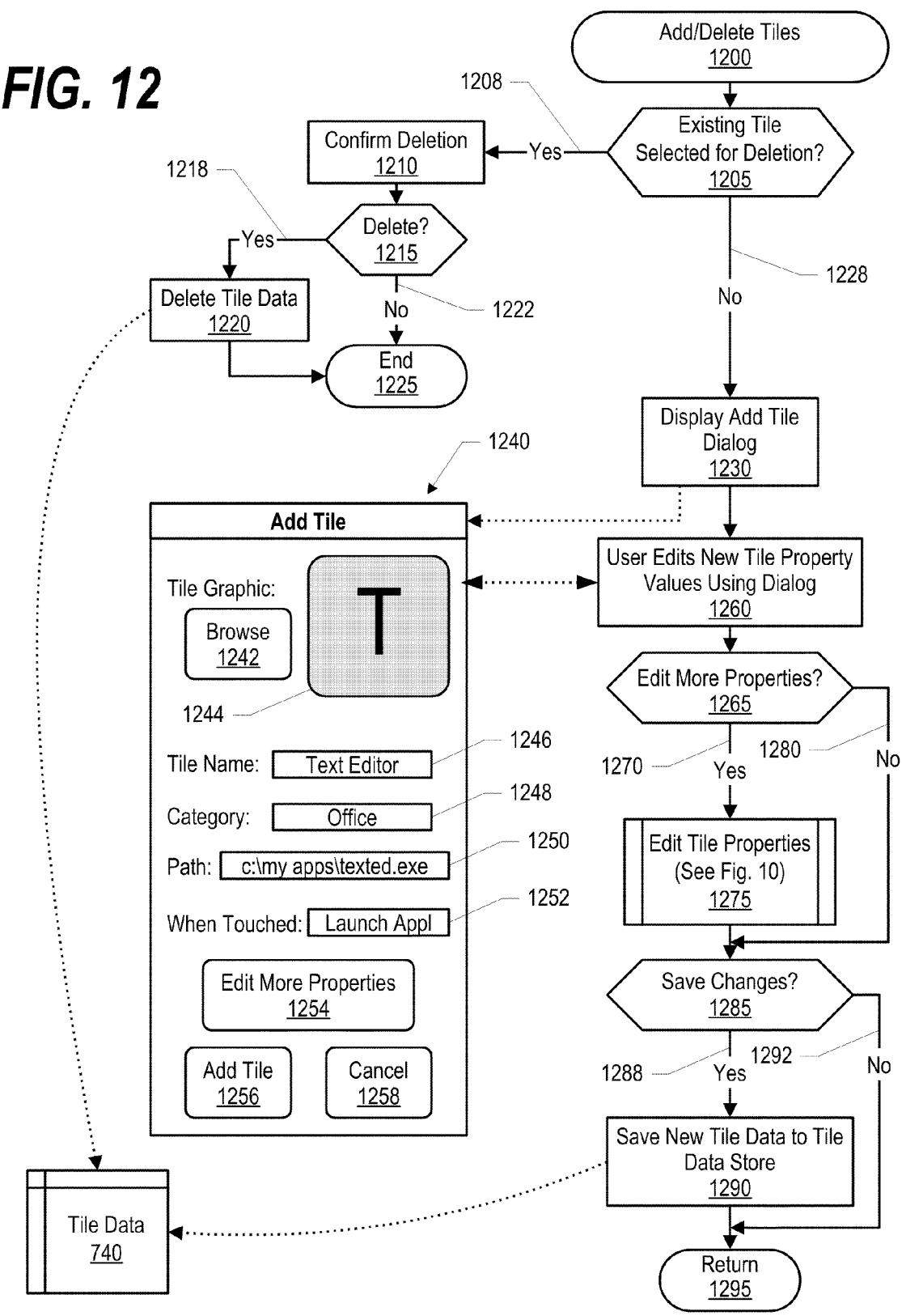
FIG. 12 is a flowchart showing steps to add, edit, and delete tiles in the tiles environment display.

FIG. 12 is a flowchart showing steps to add, edit, and delete tiles in the tiles environment display. Processing commences at 1200 whereupon a determination is made as to whether an existing tile has been selected for deletion by the user (decision 1205). If an existing tile has been selected for deletion, then decision 1205 branches to "yes" branch 1208 whereupon, at step 1210, the user is asked to confirm deletion of the tile. A determination is made as to whether the user confirms deletion of the tile (decision 1215). If deletion is confirmed, then decision 1215 branches to "yes" branch 1218 whereupon, at step 1220, the tile is deleted from tiles data memory area 740. On the other hand, if the user does not confirm deletion, then decision 1215 branches to "no" branch 1222 bypassing step 1220. Deletion processing thereafter ends at 1225.

Returning to decision 1205, if a tile was not selected for deletion, then decision 1205 branches to "no" branch 1228 whereupon, at step 1230, add tile dialog 1240 is displayed. Add tile dialog includes browse command button 1242 that, when selected, allows the user to browse for a tile graphic. Tile preview 1244 shows the currently selected tile graphic. Textbox 1246 is used to edit the tile name. In the example shown, the tile being added is for a "text editor" application. Textbox 1248 is used to edit, or assign, the category that applies to the tile. In the example, the text editor application has been assigned to the "Office" category. Textbox 1250 is used for the path of the application corresponding to the new tile. Textbox 1252 is used to control what action occurs when the tile is touched by the user using a touch-enabled screen. In the example, when the tile is touched, the action performed is to launch (e.g., execute) the application. Another example of an action that can be performed is provide a toggle function, such as turning a wireless network radio on/off or turning a microphone on/off. Additional tile properties can be edited by pressing command button 1254 whereupon tile properties dialog 1020 from FIG. 10 is displayed. Returning to FIG. 12, "Add Tile" command button 1256 is used to add the tile to the system, while "Cancel" command button 1258 is used to cancel the operation and not add the new tile to the system.

At step 1260, the user interacts with add tile dialog 1240. A determination is made as to whether the user requests to edit additional tile properties by selecting command button 1254 (decision 1265). If the user requests to edit more tile properties, then decision 1265 branches to "yes" branch 1270 whereupon, at predefined process 1275, the edit tile properties procedure is executed (see FIG. 10 and corresponding text for processing details). On the other hand, if the user does not request to edit additional tile properties, then decision 1265 branches to "no" branch 1280 bypassing step 1275.

When editing is finished, a determination is made as to whether the user requested that the changes be saved (decision 1285). If the user pressed Add Tile command button 1256, then decision 1285 branches to "yes" branch 1288 whereupon, at step 1290, the changes that the user made are retrieved from dialog 1240 and saved to tile data memory area 740. On the other hand, if the user pressed cancel command button 1258, then decision 1285 branches to "no" branch 1292 bypassing step 1285. Processing then returns to the calling routine at 1295.

Figure 13:
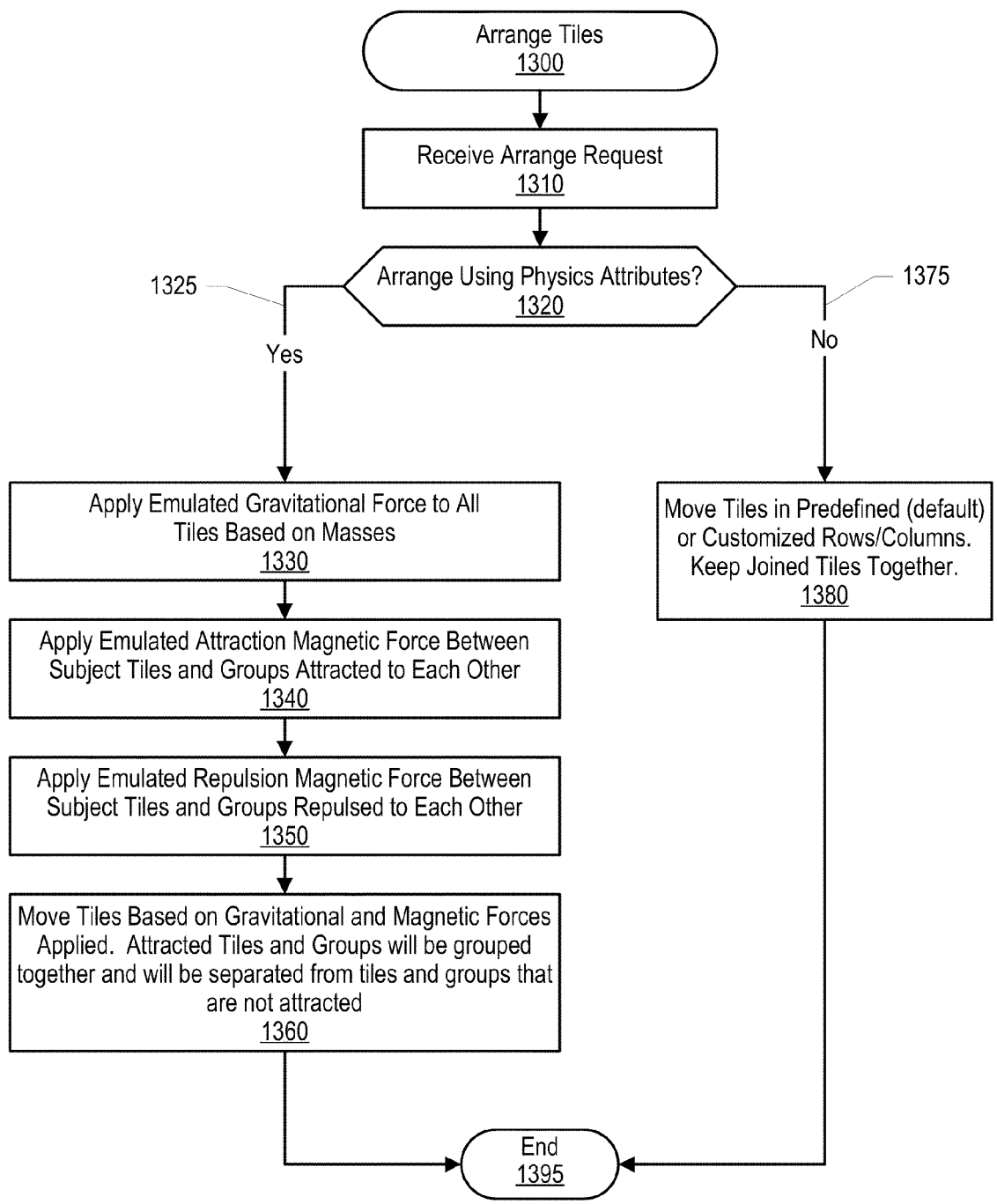
FIG. 13 is a flowchart showing steps to arrange tiles visible in the tiles environment display.

FIG. 13 is a flowchart showing steps to arrange tiles visible in the tiles environment display. Processing commences at 1300 whereupon, at step 1310, a request is received to arrange the tiles in the tiles environment display. A determination is made, based on user preferences, as to whether the automatic tile arrangement uses physics attributes to arrange the tiles (decision 1320). If physics attributes are used to arrange the tiles, then decision 1320 branches to "yes" branch 1325 to apply the physics attributes to the arrangement.

At step 1330, emulated gravitational forces are applied to all of the tiles based on the tiles masses. More massive objects would move less towards less massive objects, while less massive (e.g. lighter) objects would move more towards the more massive objects. At step 1340, emulated attractive magnetic forces are applied between tiles that are attracted to each other, and at step 1350, emulated repulsive magnetic forces are applied between tiles that are repelled from each other. At step 1360, the tiles are moved based on the emulated forces applied to each tile. Tiles attracted to one another will be grouped together and physically separated from tiles and groups to which they are not attracted. Tiles that have been joined (see FIGS. 17-21) are kept together (joined) in step 1360.

Returning to decision 1320, if the tiles are not being arranged using physics attributes, then decision 1320 branches to "no" branch 1375 whereupon, at step 1380, the tiles are moved to either predefined (or default) locations or to customized row/column locations. Tiles that have been joined (see FIGS. 17-21) are kept together (joined) in step 1380.

FIG. 14 is a flowchart showing steps to handle movement of tiles within the tiles environment display. Processing commences at 1400 whereupon, at step 1405, a tile is touched by a user using a movement gesture. At step 1410, tile properties corresponding to the tile (or groups of tiles in the case of joined tiles) are retrieved from tiles data memory area 740. These properties include the tile's emulated mass (weight), friction, attraction forces, repulsion forces, and the like.

A determination is made as to whether the user performed a "flick" gesture on the tile (decision 1415). A flick gesture occurs when a user "flicks" at a tile using a quick flicking motion in a particular direction. If a flick gesture was performed, decision 1415 branches to "yes" branch 1418 whereupon a determination is made as to whether the user has requested that the system use enhanced physics emulation when moving tiles (decision 1420). If enhanced physics emulation is being used, then decision 1420 branches to "yes" branch 1422 whereupon, at step 1425, the tile movement, speed, and distance traveled is determined by emulated physics forces (e.g., mass, gravity, friction, magnetic forces, etc.) in light of the flick gesture force applied by the user. So, for example, after being flicked, a light (less massive) tile would travel faster (given the same flick force) than a more massive tile. In addition, while moving across the screen, a tile would move towards more massive tiles due to gravity and would move towards tiles with an attractive magnetic force, while being repelled from tiles with repelling forces. At step 1430, the way the tile interacts with other tiles, such as whether the tile bounces off the other tile, squishes into the other tile, springs off the other tile, etc. are also determined by the emulated physics forces as well as the surface tension of the tiles involved (see FIG. 10, control 1046, and corresponding text for a description and example of a surface tension).

Returning to decision 1420, if physics emulation is not being used, then decision 1420 branches to "no" branch 1432 whereupon, at step 1435, the tile movement, speed, and distance is determined by the force of the flick gesture with all tiles being treated as having the same mass with no gravitational or magnetic attractive/repulsive forces. At step 1440, tile interaction when bumping into other tiles is treated with each tile having the same surface tension attributes.

Returning now to decision 1415, if a flick gesture was not received, then a drag gesture was received and decision 1415 branches to "no" branch 1442. A drag gesture is performed by the user placing a finger on a tile and moving the finger on the display in any direction. A determination is made as to whether enhanced physics emulation is being used (decision 1445). If enhanced physics emulation is being used, then decision 1445 branches to "yes" branch 1448 whereupon, at step 1450, the tile movement is determined by emulated physics forces (e.g., mass, gravity, friction, magnetic forces, etc.) in light of the movement force applied by the user. So, for example, while being moved, a less massive tile would travel faster (given the same drag force) than a more massive tile. In addition, high coefficients of frictional forces (e.g., emulating a gravel driveway) would cause tile movement to be more difficult and slower than when having low coefficients of frictional forces (e.g., emulating a smooth glass surface). At step 1455, tactile feedback is provided to the user based on the emulated physics forces. For example, when a massive object is being moved the tactile feedback is slow, difficult movement emulating the difficulty one would have actually moving such an object, while a lightweight object might have little tactile feedback since moving such on object would be considerably easier.

Returning to decision 1445, if physics emulation is not being used, then decision 1445 branches to "no" branch 1458 whereupon, at step 1460, the tile movement and speed is determined by the speed of the drag gesture with all tiles being treated as having the same mass with no gravitational or magnetic attractive/repulsive forces.

A determination is made as to whether is made as to whether the tile is dragged and dropped between to other tiles (decision 1465). If the tile is dragged and dropped between two other tiles, then decision 1465 branches to "yes" branch 1468 whereupon, at step 1470, the tile being moved is inserted in between the other tiles and other tiles in the tiles environment are moved horizontally and/or vertically to accommodate the tile insertion. On the other hand, if the tile is not dropped between other tiles, then decision 1465 branches to "no" branch 1472 bypassing step 1470. Once the tile movement gesture has been handled, the tile movement process ends at 1495.

FIG. 15 is a second flowchart showing steps to handle movement of tiles within the tiles environment display. In this second embodiment, processing commences at 1500 whereupon, at step 1505, tile movement is received at the display by a user using a gesture (e.g., a flick gesture, a drag gesture, etc.). A determination is made as to whether enhanced physics emulation is enabled (decision 1510). If enhanced physics emulation is enabled, then decision 1510 branches to "yes" branch 1512 whereupon, at step 1514 the tile properties are retrieved from tiles data memory area 740. Tile properties include emulated mass, gravity, frictional force, surface tension, and the like. At step 1515, the emulated mass and gravity values for the tile are retrieved. At step 1520, frictional force and gravity values are applied to the tile. At step 1525, feedback force is provided to the user based on the tile's mass and friction value. For example, when a massive object is being moved the tactile feedback is slow, difficult movement emulating the difficulty one would have actually moving such an object, while a lightweight object might have little tactile feedback since moving such on object would be considerably easier. At step 1530, the movement of the tile is adjusted based on the tile's mass and gravity, and at step 1535, the surface tension of the tile that is being moved is retrieved.

At step 1540, the first (closest) tile to the tile that is being moved is selected. At step 1545, emulated gravitational force is applied between the tile being moved resulting in a movement calculation. At step 1550, emulated magnetic (attraction/repulsion) forces between the tile being moved and the selected tile are applied resulting in a modified movement calculation. At step 1555, the movement path of the tile that is being moved is altered based on the movement calculations that reflect the interaction between the tile being moved and the selected tile. In one embodiment, the selected tile (the tile that is not being moved by the user) is also moved based on the movement calculations.

A determination is made as to whether the tile that is being moved (flicked or dragged) hits another tile (decision 1560). If the tile hits another tile, then decision 1560 branches to "yes" branch 1562 whereupon, at step 1565 the surface tension of the tile that is hit by the tile that is being moved is retrieved from tile properties memory area 740. At step 1570, a bounce trajectory is calculated based movement of the tile being moved and the interaction of the surface tension between the two tiles. At step 1575, the movement of the tile that is being moved by the user is adjusted based upon the calculated bounce trajectory. In one embodiment, the tile that is hit (the one that is not being moved by the user) is also moved based upon the calculated bounce trajectory (e.g., away from the tile being moved by the user).

A determination is made as to whether there are more tiles proximate to the movement path taken by the tile that is being moved (decision 1580). This movement path may have been adjusted based upon the interaction of gravitational and magnetic-type forces as well as any calculated bounce trajectories. If there are more proximate tiles, then decision 1580 branches to "yes" branch 1582 which loops back to select the next tile on the path of the tile that is being moved and process the interaction between the tiles as described in steps 1545 to 1575. This looping continues until there are no more tiles proximate to the tile being moved (i.e., the tile stops moving), at which point decision 1580 branches to "no" branch 1584 and tile movement processing ends at 1585.

Returning to decision 1510, if enhanced physics emulation is not being used, then decision 1510 branches to "no" branch 1592 whereupon, at 1595, the tile is moved in the direction chosen by the user and enhanced physics emulation forces (gravity, magnetism, friction, etc.) are not used to alter the tile's movement.

Figure 16:
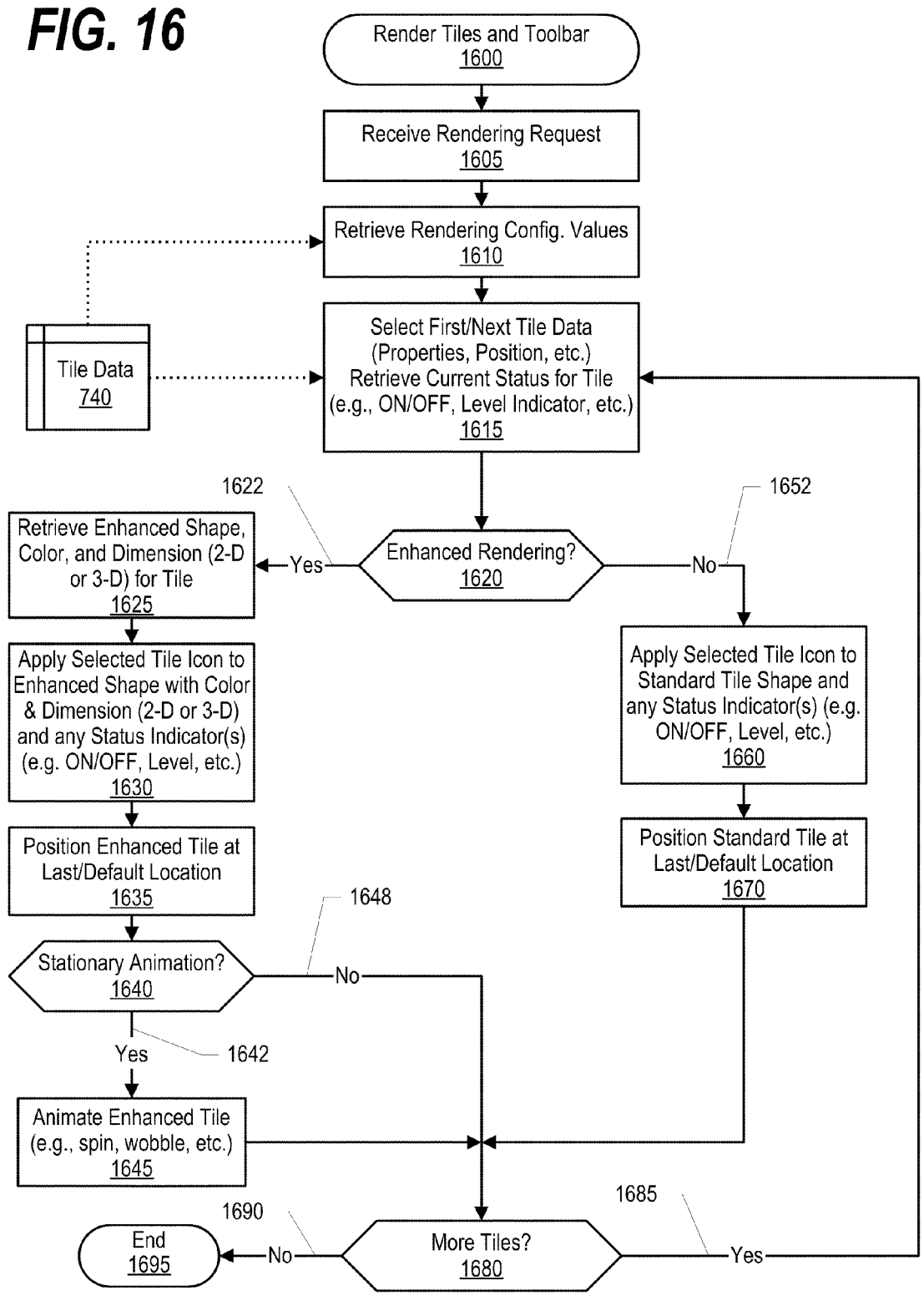
FIG. 16 is a flowchart showing steps to render tiles and a toolbar in the tiles environment display.

FIG. 16 is a flowchart showing steps to render tiles and a toolbar in the tiles environment display. Processing commences at 1600 whereupon, at step 1605, the process receives a rendering request. At step 1610, rendering configuration values, such as whether enhanced rendering has been requested by the user, are retrieved from tiles data memory area 740. At step 1615, data corresponding to the first tile stored in tile data memory area 740 are retrieved. This data includes the tiles properties (e.g., shape, animation, color, etc.) as well as the tile's last position on the tile environment display. In addition, the tile's current status is retrieved (e.g., whether the tile was ON or OFF with a toggle tile, the last level in a slider tile, etc.).

A determination is made as to whether enhanced rendering has been enabled (decision 1620). In one embodiment, enhanced rendering can be turned ON or OFF for individual tiles so that tiles can be more easily distinguished from one another with some tiles using enhanced rendering and other tiles using non-enhanced rendering. In another embodiment, enhanced rendering is either enabled or disabled for the entire tiles environment so that, if enhanced rendering is turned ON all tiles are displayed using enhanced rendering and, conversely, if enhanced rendering is turned OFF all tiles are displayed without using enhanced rendering.

If enhanced rendering is ON (either for this particular tile or for all tiles), then decision 1620 branches to "yes" branch 1622 whereupon, at step 1625, the enhanced shape, color, texture, and dimension (2-D or 3-D) is retrieved. At step 1630, the process applies the retrieved shape, color, texture, and dimension to the selected tile. In addition, any visible status indicators, such as ON or OFF in the case of a toggle tile or a level indicator in the case of a slider tile, etc., are applied to the selected tile at step 1630. At step 1635, the tile is positioned on the display (rendered) at the last location where the tile previously appeared (or at a default location if this is the first rendering).

A determination is made as to whether stationary animation has been requested for the selected tile (decision 1640). Some examples of stationary animation include "spin" where the tile appears to spin in place, "wobble" where the tile appears to wobble back and forth, and "shake" where the tile appears to vibrate in all directions (see FIG. 11 and corresponding text for configuration details). If stationary animation has been requested for the selected tile, then decision 1640 branches to "yes" branch 1642 whereupon, at step 1645, processing applies the requested animation to the tile. On the other hand, if stationary animation has not been requested, then decision 1640 branches to "no" branch 1648 bypassing step 1645.

Returning to decision 1620, if enhanced rendering is OFF (either for this particular tile or for all tiles), then decision 1620 branches to "no" branch 1652 whereupon, at step 1660, processing applies a standard icon with a tile graphic corresponding to the tile (see, e.g., tiles 360 in FIG. 3), with a standard shape, and applies status indicators such as ON or OFF in the case of a toggle tile or a level indicator in the case of a slider tile, etc., to the selected tile. At step 1670, processing positions (renders) the selected tile on the display at the last location where the tile previously appeared (or at a default location if this is the first rendering).

A determination is made as to whether there is more data in tile data memory area 740 corresponding to additional tiles that need to be displayed in the tiles environment display (decision 1680). If there are more tiles that need to be processed and rendered, decision 1680 branches to "yes" branch 1685 which loops back to select the next tile data from tile data memory area 740 and process it as described above. This looping continues until all tile data has been processed, at which point decision 1680 branches to "no" branch 1690 and processing ends at 1695.

Figure 17:
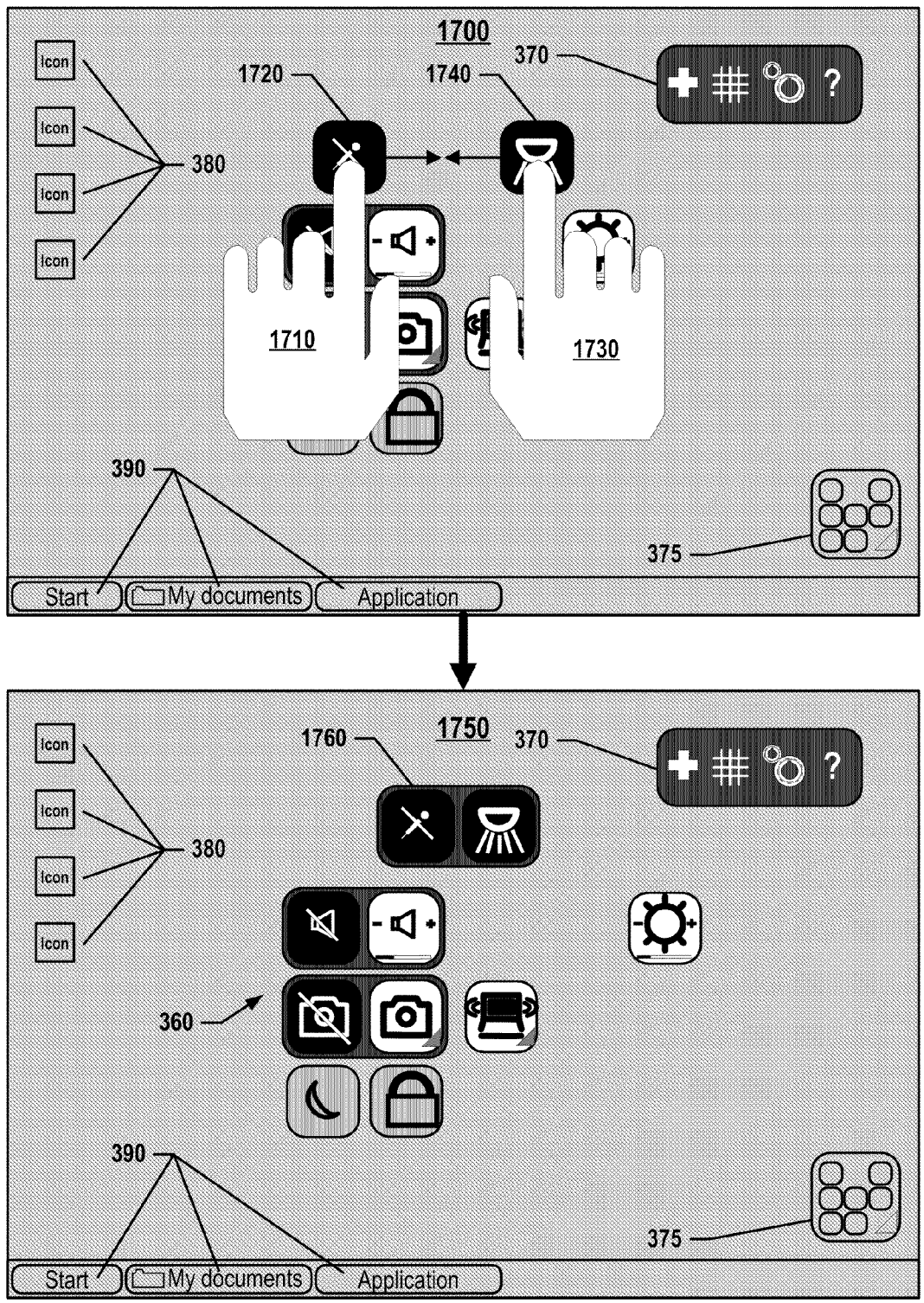
FIG. 17 is a diagram showing a tile join operation using a two-finger gesture.

FIG. 17 is a diagram showing a tile join operation using a two-finger gesture. In this example, panel 1700 shows the user joining two tiles (tile 1720 and tile 1740) using a two-finger join operation. In this example, the first finger is provided by the user's left hand 1710 and the second finger is provided by the user's right hand 1730. To perform the operation, the user places first finger from left hand 1710 on tile 1720 and, without releasing first finger, places second finger from right hand 1730 on tile 1740 and moves the tiles toward each other by sliding the first and second fingers on the display panel towards each other without releasing either tile. After the two tiles are dragged so that they are next to each other, a visual indicator, such as a circle around the tiles, appears that so the user understands that the join operation has completed successfully. At this point the user can release both of the tiles by moving his fingers off of the touch-enabled display. Display 1750 shows the result of the join operation. Here, visual indicator 1760 is shown surrounding the joined tiles.

Figure 18:
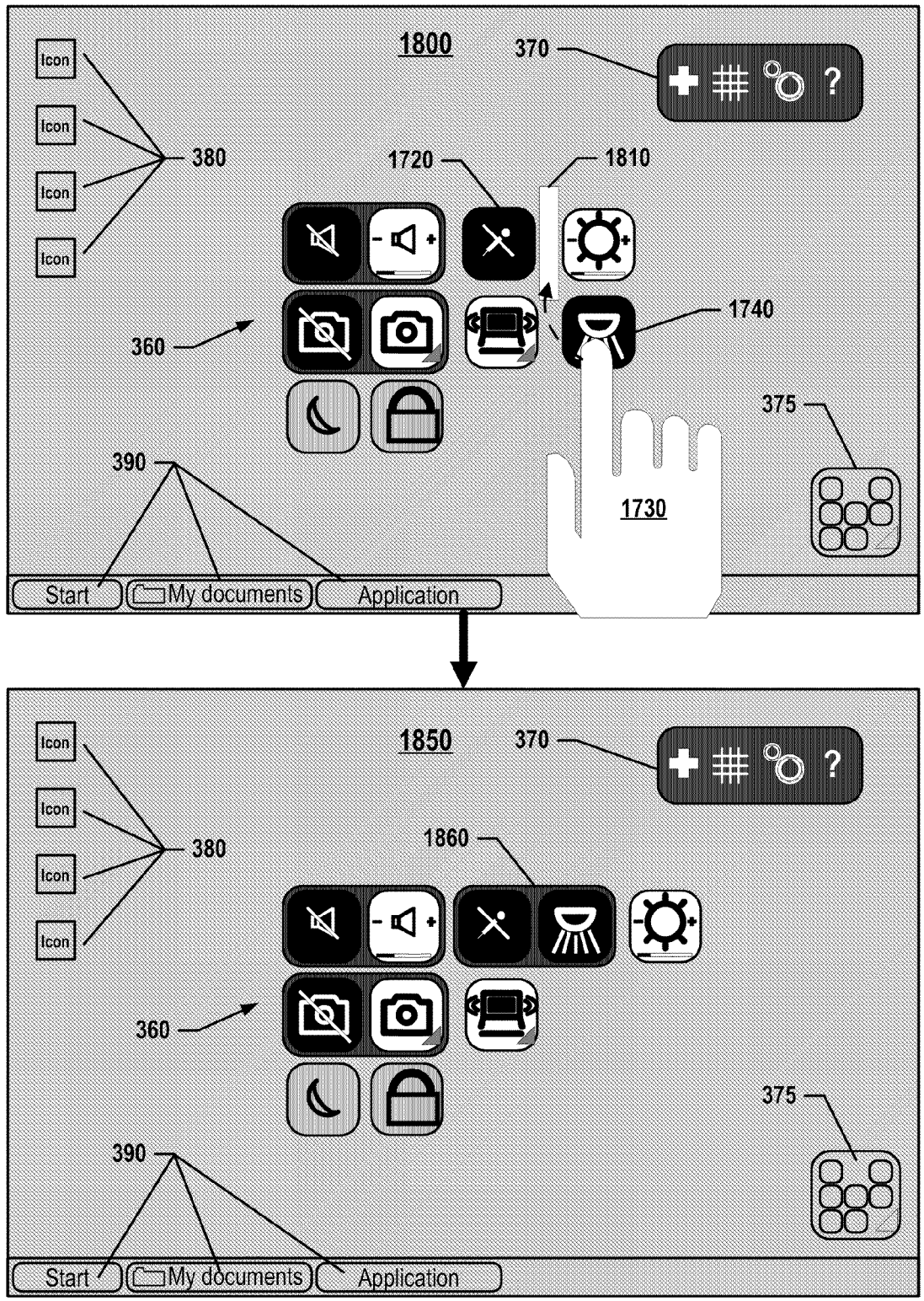
FIG. 18 is a diagram showing a tile join operation using a one-finger gesture.

FIG. 18 is a diagram showing a tile join operation using a one-finger gesture. In this example, panel 1700 shows the user joining two tiles (tile 1720 and tile 1740) using a single-finger join operation. In this example, the finger is provided by the user's right hand 1730. To perform the operation, the user places the finger on one of the tiles, in this case tile 1740, and moves the tile next to tile 1720 without releasing the finger. After a short period of time (e.g., two seconds) an indicator, such as blinking visual bar 1810 appears letting the user know that a join operation is about to take place. If the user releases the tile too quickly the tile is simply moved to the location without joining the tiles together. However, if the user waits for another visual indicator to appear, such as blinking bar 1810 becoming a solid bar (e.g. after another two seconds), then the tiles are joined. At this point the user can release the tile by lifting his finger off of the touch-enabled display. Display 1850 shows the result of the join operation. Here, visual indicator 1860 is shown surrounding the joined tiles showing that the tiles have been joined.

Figure 19:
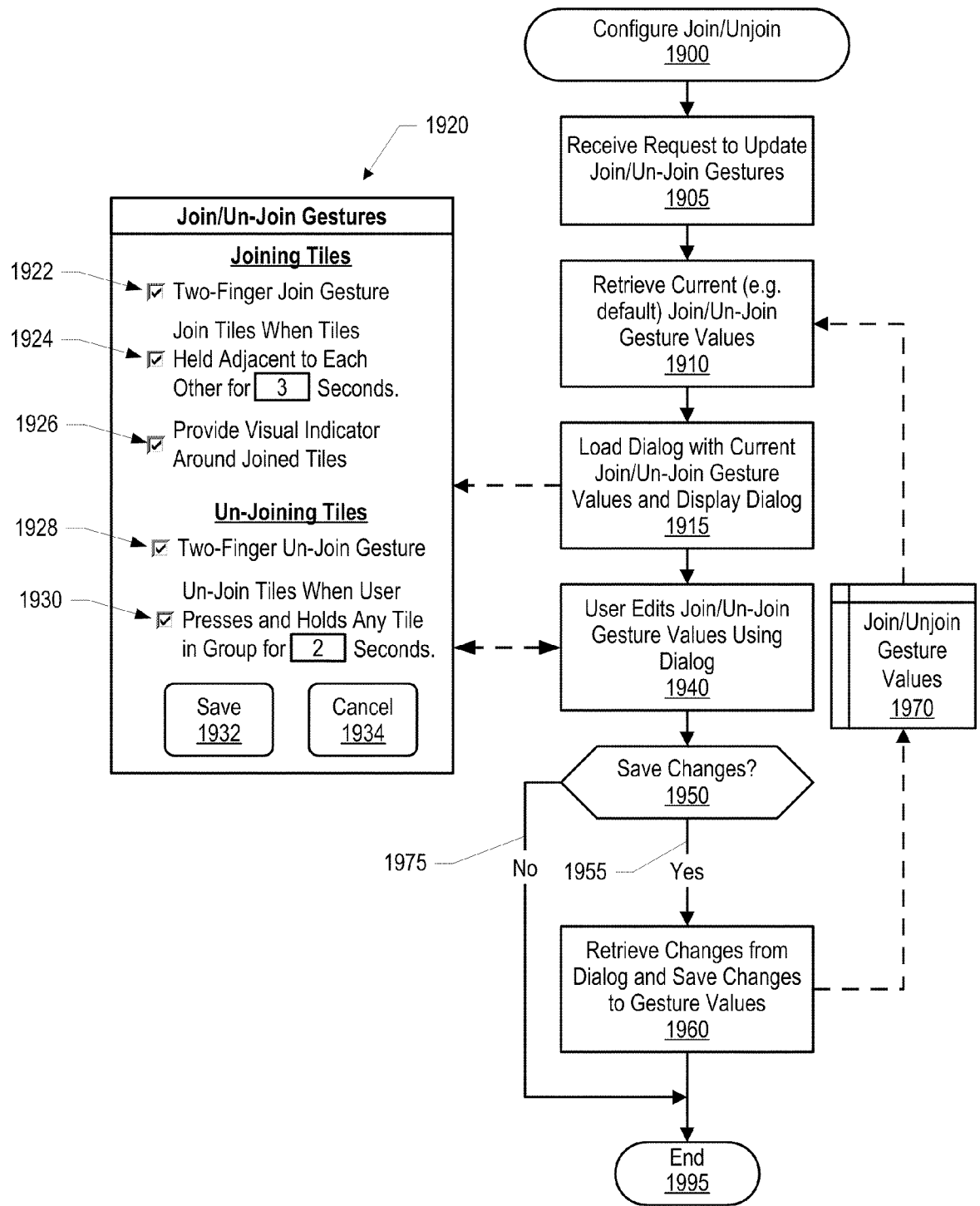
FIG. 19 is a flowchart showing steps to configure the tile join and unjoin operations.

FIG. 19 is a flowchart showing steps to configure the tile join and unjoin operations. Processing commences at 1900 whereupon, at step 1905, a request is received to configure the join and unjoin gestures used by the user. At step 1910, the system retrieves the current (or default) join and unjoin gesture values from join/unjoin gesture values memory area 1970. At step 1915, join/unjoin gestures dialog 1920 is loaded with the retrieved join and unjoin gesture values.

Join/unjoin gestures dialog 1920 includes controls for both joining tiles and unjoining tiles. Checkbox 1922 indicates whether a two-finger join gesture is enabled (see FIG. 17 for an example). Checkbox 1924 indicates whether a single-finger join operation is enabled and provides a textbox where the user can enter how long the tiles need to be held adjacent to each other before the single-finger join operation takes place. In the example, the user has specified that the period of time is three seconds. See FIG. 18 for an example of a single-finger join operation. Checkbox 1926 indicates whether a visual indicator is provided around joined tiles, such as a solid outline around the tiles (see outline 1750 in both FIGS. 17 and 18).

Figure 22:
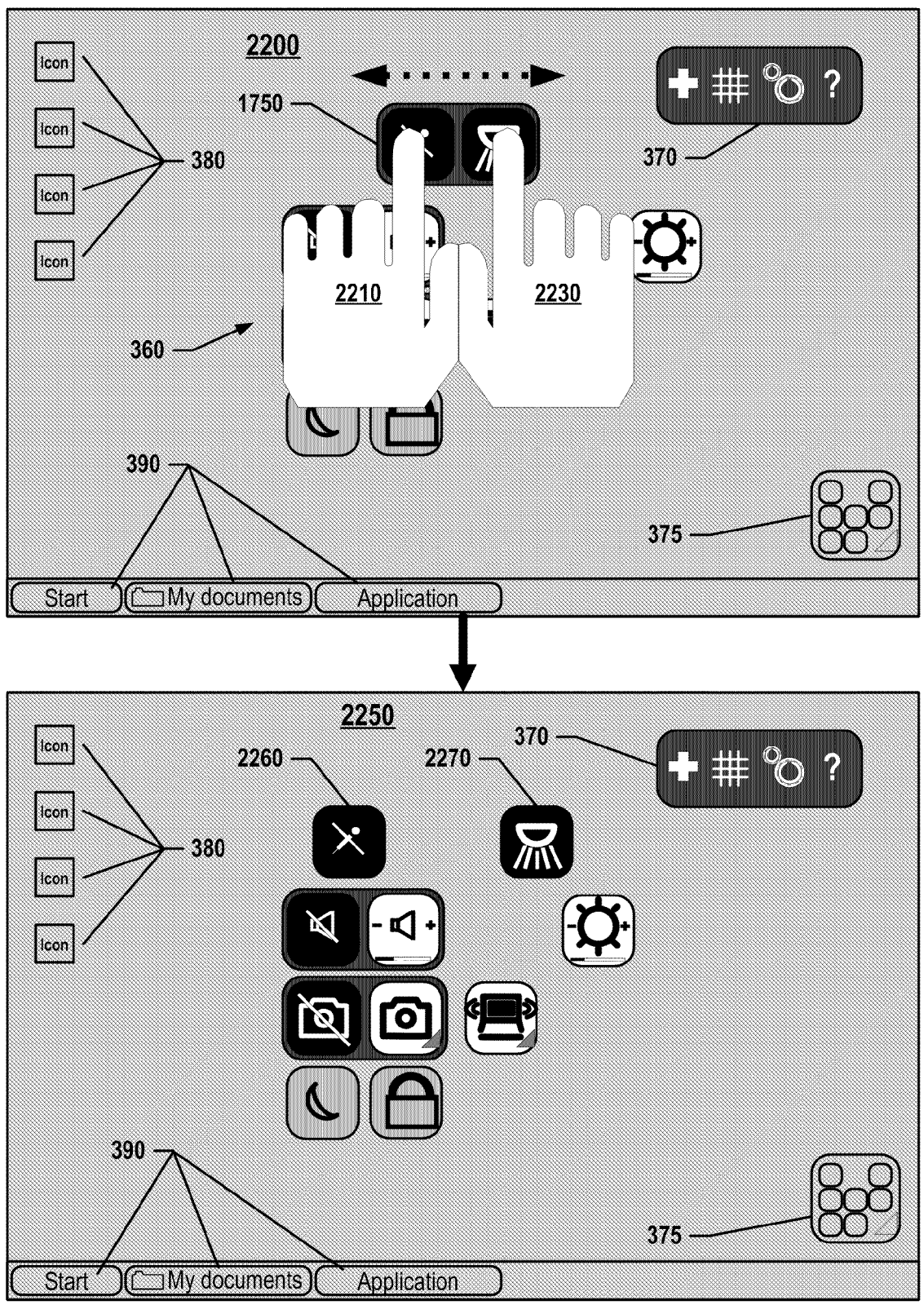
FIG. 22 is a diagram showing a tile unjoin operation using a two-finger gesture.

Unjoining gesture controls include checkbox 1928 that indicates whether a two-finger unjoin gesture is enabled (see FIG. 22 and corresponding text for an example). Checkbox 1930 indicates whether a single-finger unjoin gesture is enabled and how long the user needs to hold the tile before the unjoin operation takes place. In the example, the user has specified that the period of time is two seconds. See FIG. 23 for an example of a single-finger unjoin operation.

At step 1940, the user edits the join/unjoin gesture values using dialog 1920. Command button 1932 is selected by the user in order to save changes made to join/unjoin gestures dialog 1920 while command button 1934 is selected by the user in order to cancel any changes that were made by the user. When the user is finished editing the dialog, a determination is made as to whether the user requested to save the changes by selecting the save command button 1932. If the user requested to save the changes, then decision 1955 branches to "yes" branch 1955 whereupon, at step 1960, the join/unjoin gesture values are retrieved from dialog 1920 and saved to join/unjoin gesture values memory area 1970. On the other hand, if the user requested to cancel the changes, then decision 1950 branches to "no" branch 1975 bypassing step 1960. Processing of the join/unjoin configuration ends at 1995.

Figure 20:
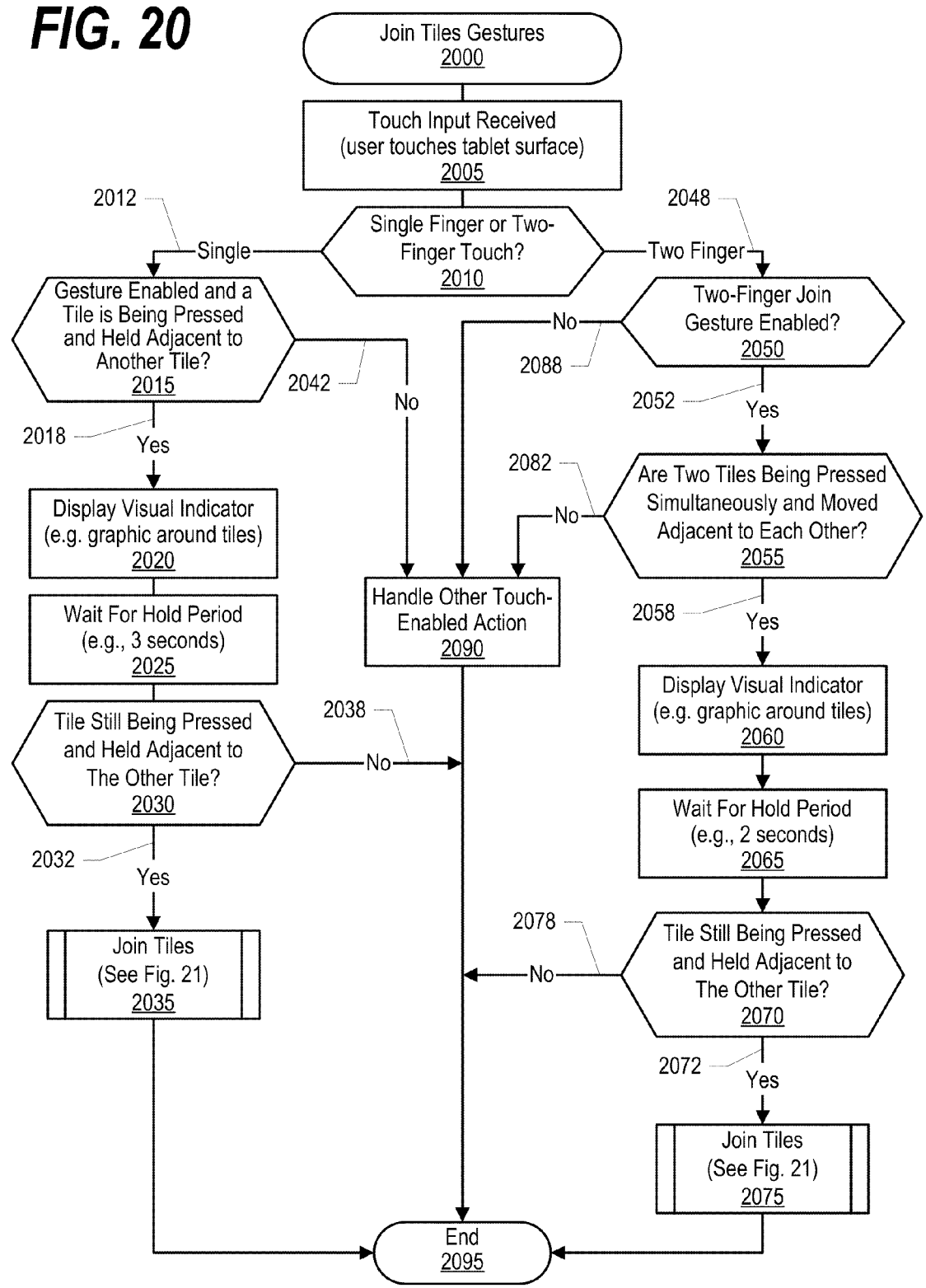
FIG. 20 is a flowchart showing steps to manage join tile gestures received from a user.

FIG. 20 is a flowchart showing steps to manage join tile gestures received from a user. Processing commences at 2000 whereupon, at step 2005 touch input is received when the user touches the display surface. A determination is made as to whether the touch-enabled display is being touched by a single finger or by two fingers (decision 2010).

If the display is being touched by a single finger, then decision 2010 branches to "single" branch 2012. A determination is made as to whether the single-finger join gesture has been enabled and if a tile is currently being pressed (selected) by the user and is being held adjacent to another tile (decision 2015). If the single-finger join gesture is enabled and a tile has been selected and is being held adjacent to another tile, then decision 2015 branches to "yes" branch 2018 whereupon, at step 2020 a visual indicator, such as a blinking bar between the tiles or a blinking outline around the tiles is displayed to inform the user that the system is about to join the tiles. At step 2025, the system waits for a designated hold period (see checkbox 1924 in FIG. 19). A determination is made as to whether the tile is still being held adjacent to the other tile after the hold period expires (decision 2030). If the tile is still being held adjacent to the other tile after the hold period expires, then decision 2030 branches to "yes" branch 2032 whereupon, at predefined process 2035, the tiles are joined (see FIG. 21 and corresponding text for processing details). On the other hand, if the tile is no longer being selected, then decision 2030 branches to "no" branch 2038 bypassing predefined process 2035. Returning to decision 2015, if either the single finger join gesture is not enabled OR a tile is not being selected and held adjacent to another tile, then decision 2015 branches to "no" branch 2042 whereupon, at step 2090, some other touch-enabled action is handled (e.g., move tile, launch tile, etc.). Processing of a single-finger join operation thereafter ends at 2095.

Returning to decision 2010, if two fingers are currently touching the display panel, then decision 2010 branches to "two fingers" branch 2048 whereupon a determination is made as to whether the two-finger join gesture has been enabled (decision 2050). If the two-finger join gesture has been enabled, then decision 2050 branches to "yes" branch 2052 whereupon a determination is made as to whether two tiles are currently being pressed (selected) and have been moved to be adjacent to each other (decision 2055). If two tiles are currently being selected and positioned adjacent to each other, then decision 2055 branches to "yes" branch 2058 whereupon, at step 2060, a visual indicator, such as a blinking bar between the tiles or a blinking outline around the tiles is displayed to inform the user that the system is about to join the tiles. At step 2065, the system waits for a designated hold period (see checkbox 1930 in FIG. 19). A determination is made as to whether the tiles are still being held adjacent to each other after the hold period expires (decision 2070). If the tiles are still being held adjacent to each other after the hold period expires, then decision 2070 branches to "yes" branch 2072 whereupon, at predefined process 2075, the tiles are joined (see FIG. 21 and corresponding text for processing details). On the other hand, if either of the tiles are no longer being selected, then decision 2070 branches to "no" branch 2078 bypassing predefined process 2035. Returning to decision 2055, if two tiles are not being selected and moved adjacent to each other, then decision 2055 branches to "no" branch 2082 whereupon, at step 2090, another touch-enabled action (e.g., move tiles, etc.) is performed. Returning to decision 2050, if the two-finger join gesture is not enabled, then decision 2050 branches to "no" branch 2088 whereupon, at step 2090, another touch-enabled action (e.g., move tiles, etc.) is performed. Processing of a two-finger join operation thereafter ends at 2095.

Figure 21:
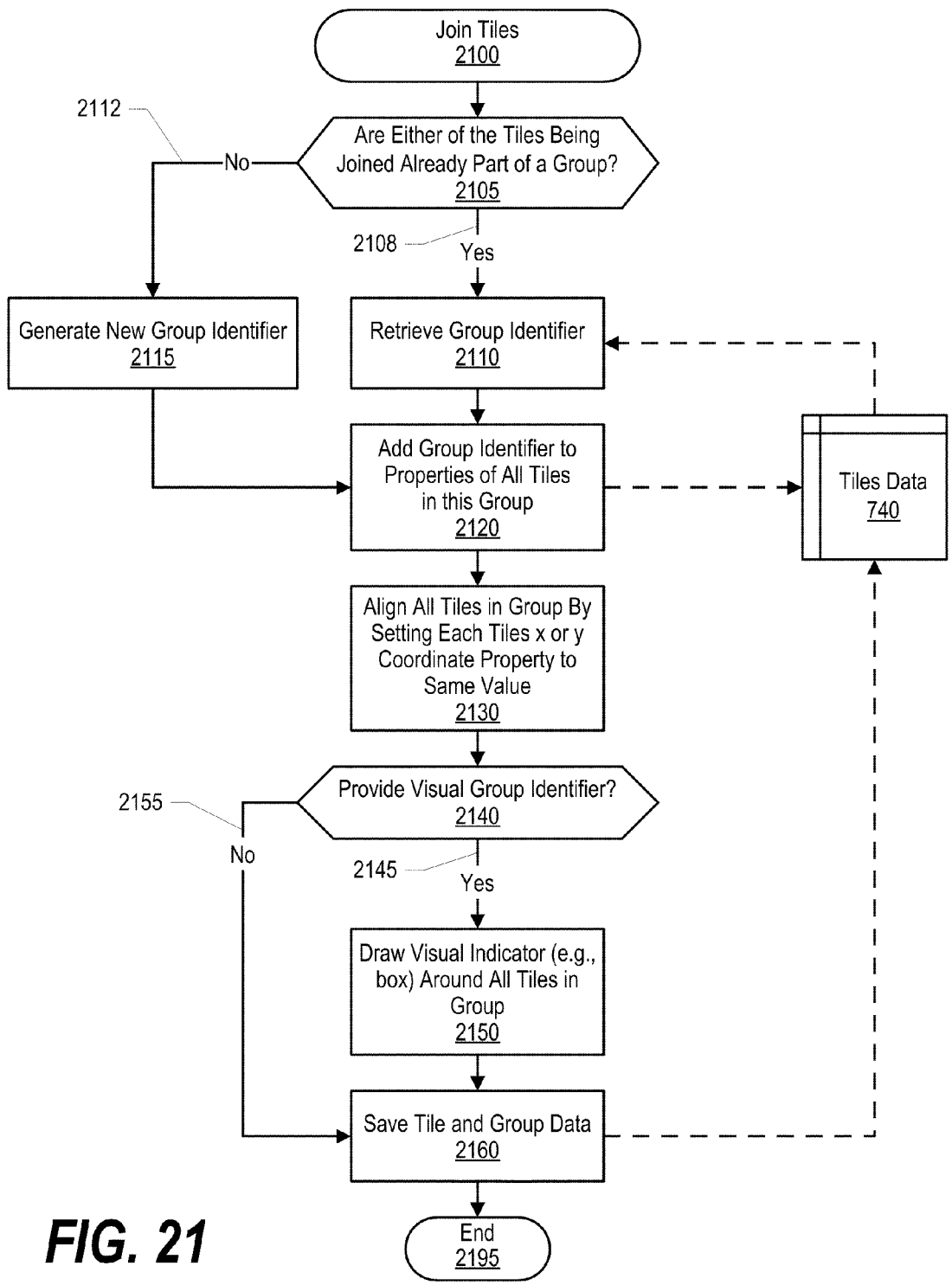
FIG. 21 is a flowchart showing steps to join tiles as indicated by a received user gesture.

FIG. 21 is a flowchart showing steps to join tiles as indicated by a received user gesture. This procedure is called by predefined processes 2035 and 2075 from FIG. 20 when a join gesture is received from the user. Returning to FIG. 21, processing commences at 2100 whereupon a determination is made as to whether either of the tiles that are being joined is already in a group of tiles (decision 2105). If either tile is already in a group, then decision 2105 branches to "yes" branch 2108 whereupon, at step 2110, the existing group identifier is retrieved from tiles data memory area 740 with the identifier corresponding to the tile that is already a member of a group. On the other hand, if neither tile is already part of a group, then decision 2105 branches to "no" branch 2112 whereupon, at step 2115, a new group identifier is generated. At step 2120, the group identifier (either the one generated at step 2115 or the one retrieved at step 2110) is included in the tile data for all tiles in the group.

At step 2130, all of the tiles in the group are aligned and visually grouped (e.g., using a common x or y coordinate, etc.). A determination is made as to whether a visual group identifier is being provided (decision 2140). See FIG. 19, checkbox 1926 and corresponding text for details and see FIGS. 17 and 18, outline 1760 for an example of a visual indicator). If a visual indicator is being provided, then decision 2140 branches to "yes" branch 2145 whereupon, at step 2150 the visual indicator is displayed proximate to the joined tiles (e.g., an outline surrounding the tiles, etc.). On the other hand, if a visual group indicator is not being provided, then decision 2140 branches to "no" branch 2155 bypassing step 2150. At step 2160, the tile and group data is saved to tiles data memory area 740. Join tiles processing thereafter ends at 2195.

FIG. 22 is a diagram showing a tile unjoin operation using a two-finger gesture. In this example, panel 2200 shows the user unjoining a previously joined set of tiles (tile group 1750) using a two-finger unjoin operation. In this example, the first finger is provided by the user's left hand 2210 and the second finger is provided by the user's right hand 2230. To perform the operation, the user places first finger from left hand 2210 on the left side of tile group 1750 and, without releasing first finger, places second finger from right hand 2230 on the right side of tile group 1750 and slides the fingers away from each other in the direction indicated by the dashed arrow line. After tile group 1750 is dragged apart, the resulting tile environment display is shown in panel 2250. Here, tile 2260 is separated from tile 2270 and the tiles are no longer in a tile group. In addition, the visual indicator that surrounded tile group 1750 has been removed.

Figure 23:
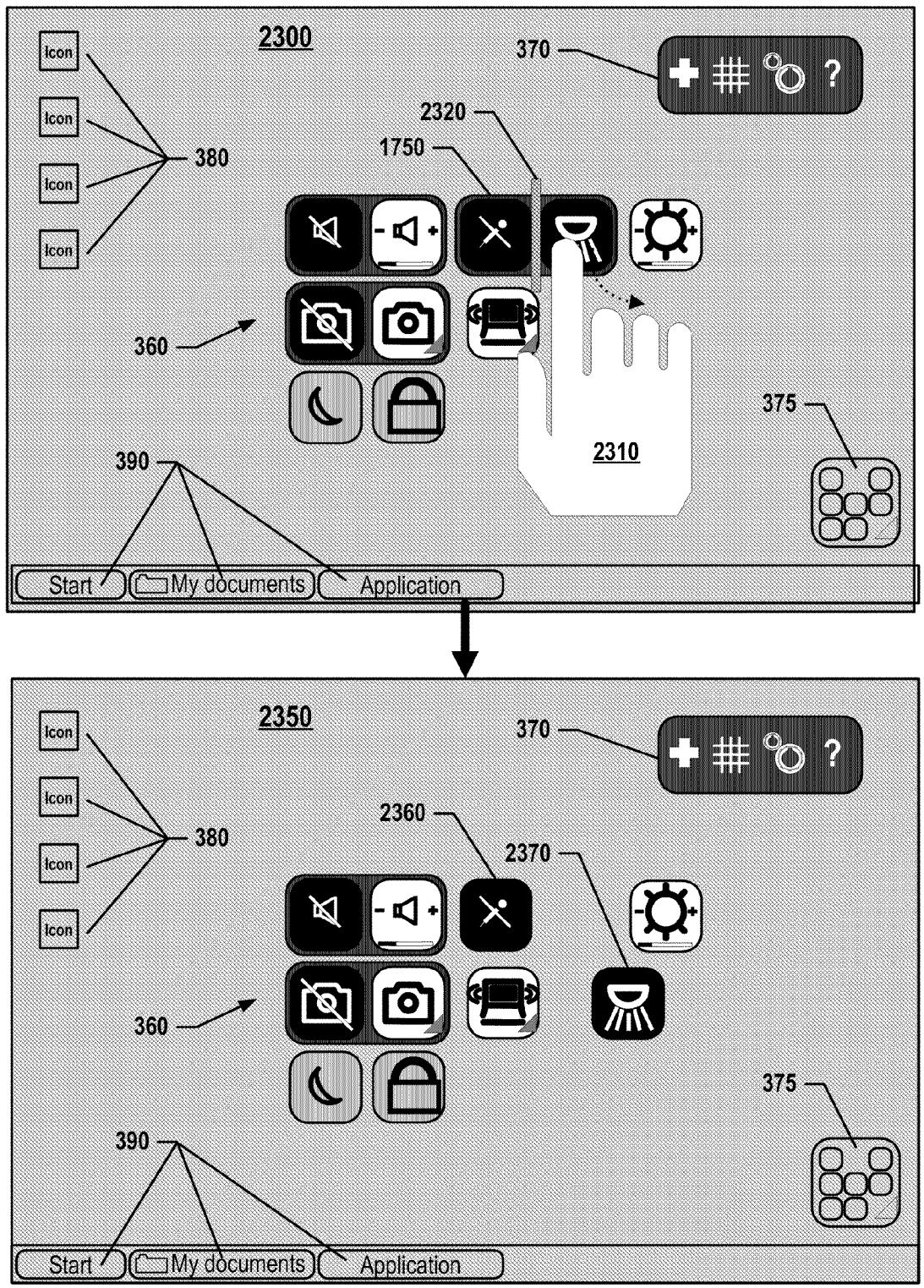
FIG. 23 is a diagram showing a tile unjoin operation using a one-finger gesture.

FIG. 23 is a diagram showing a tile unjoin operation using a one-finger gesture. Panel 2300 shows the user placing a finger (2310) on the left side of tile group 1750 over one of the two tiles in the group. Here, the user maintains pressure over the tile in the tile group for a period of time (e.g., three seconds) at which point visual tile separator bar 2320 appears indicating that the system has identified the user's action as a tile unjoin action. If the user does not wish to separate the tile from the tile group, the user can simply release the pressure without sliding the finger. On the other hand, after tile separator bar 2320 appears, if the user wants to separate the tile from tile group 1750, he simply slides the finger away from the tile group (e.g., in the path of the dashed arrow line). The resulting tile environment display is shown in display panel 2250. Here, tile 2260 is separated from tile 2270 and the tiles are no longer in a tile group. In addition, the visual indicator that surrounded tile group 1750 has been removed.

Figure 24:
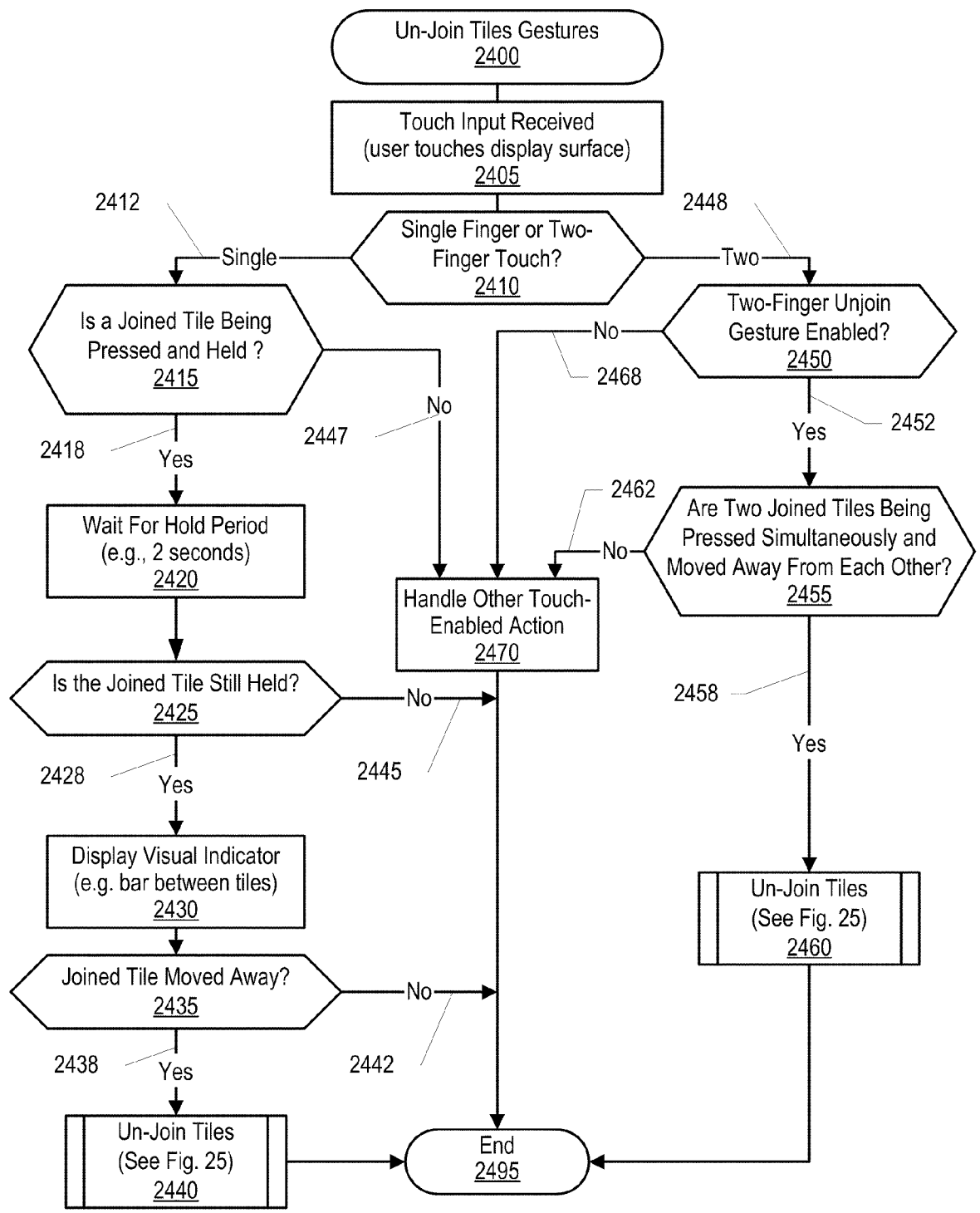
FIG. 24 is a flowchart showing steps to manage unjoin tile gestures received from a user.

FIG. 24 is a flowchart showing steps to manage unjoin tile gestures received from a user. Processing commences at 2400 whereupon, at step 2405, the user touches the touch-enabled display surface. A determination is made as to whether the user is touching the display panel with a single finger or with two fingers (decision 2410). If the user is touching the display panel with a single finger, then decision 2410 branches to "yes" branch 2412 whereupon a determination is made as to whether a tile that is in a tile group (a joined tile) is currently being pressed and held by the user's touch (decision 2415). If a tile within a tile group (a joined tile) is being pressed by the user, then decision 2415 branches to 2418 whereupon, at step 2420, a timer is started for a user-configurable amount of time (e.g., three seconds) after which time a determination is made as to whether the tile is still being held (decision 2425). If the tile is still being held, then decision 2425 branches to "yes" branch 2428 whereupon, at step 2430, a tile separator bar is displayed between the tile in the group that is being separated from the group. A determination is made as to whether the tile that is being held is moved away from the tile group (decision 2435). If the tile is moved away from the tile group, then decision 2435 branches to "yes" branch 2438 whereupon, at predefined process 2440, the tile is unjoined from the group (see FIG. 25 and corresponding text for processing details). Returning to decision 2435, if the user does not move the tile away from the group, then decision 2435 branches to "no" branch 2442 bypassing predefined process 2440 and the tile is not unjoined from the group of joined tiles. Returning to decision 2425, if the user is no longer pressing the tile when the hold period expires, then decision 2425 branches to "no" branch 2445 canceling the unjoin operation. Returning to decision 2415, if a joined tile is not being pressed (selected) and held, then decision 2415 branches to "no" branch 2447 whereupon, at step 2470, another touch-enabled action is performed (e.g., a tile is moved, a tapped tile is launched, etc.).

Returning to decision 2410, if the user touches the display with two fingers rather than one, then decision 2410 branches to "two" branch 2448 whereupon a determination is made as to whether a two-finger unjoin gesture has been enabled (decision 2450, see FIG. 19, control 1928 for details regarding enabling/disabling this gesture). If the two finger join gesture has been enabled, then decision 2450 branches to "yes" branch 2452 whereupon, a determination is made as to whether two joined tiles are being pressed (selected) and moved away from each other (decision 2455). If two tiles are being selected and moved away from each other, then decision 2455 branches to "yes" branch 2460 whereupon, at predefined process 2460, the unjoin process is performed (see FIG. 25 and corresponding text for processing details). Returning to decision 2455, if two tiles are not being selected or, if two tiles are being selected but they are not being moved away from each other, then decision 2455 branches to "no" branch 2462 whereupon, at step 2470, another touch-enabled action is performed. Returning to decision 2450, if a two finger unjoin gesture has not been enabled, then decision 2450 branches to "no" branch 2468 whereupon, at step 2470, another touch-enabled action is performed. Processing used to handle unjoin tile gestures thereafter ends at 2495.

Figure 25:
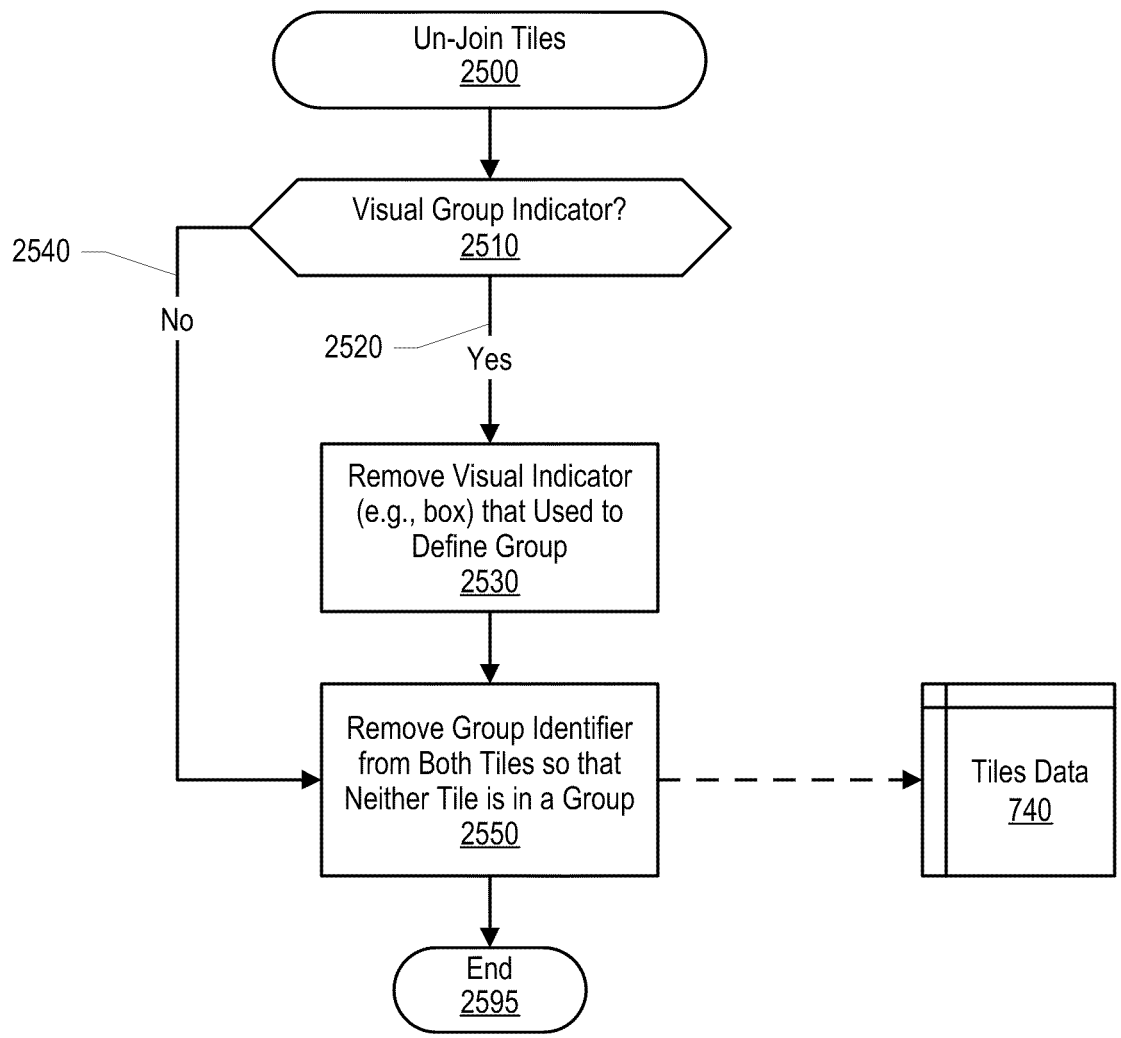
FIG. 25 is a flowchart showing steps to unjoin tiles as indicated by a received user gesture.

FIG. 25 is a flowchart showing steps to unjoin tiles as indicated by a received user gesture. Processing commences at 2500 whereupon a determination is made as to whether a visual group indicator was used to visually identify the group of tiles that is being unjoined (decision 2510). If a visual identifier was used, then decision 2510 branches to "yes" branch 2520 whereupon, at step 2530 the visual group indicator is removed. Returning to decision 2510, if a visual group indicator was not used to visually identify the group, then decision 2510 branches to "no" branch 2540 bypassing step 2530. At step 2550, processing removes the group identifier from both tiles so that neither tile is in the group. This is performed by removing the group identifier from the corresponding tiles' data stored in tiles data memory area 740. Processing thereafter ends at 2595.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
receiving a request to join a first graphical user interface object with a second graphical user interface object, wherein the request is received as a single-finger gesture that is received at a touch-enabled display screen from a user operating the machine, the receiving comprising:
detecting a selection of the first graphical user interface object;
detecting a movement of the first graphical user interface object adjacent to the second graphical user interface object;
detecting a holding of the first graphical user interface object adjacent to the second graphical user interface object for a first predetermined amount of time;
in response to detecting the holding for the first predetermined amount of time, displaying a first visual indicator proximate to the first and second graphical user interface objects that indicates that the objects are about to be joined; and
detecting a further holding of the first graphical user interface object adjacent to the second graphical user interface object for a second predetermined period of time after the displaying of the first visual indicator,
associating the first and second graphical user interface objects with each other in response to receiving the request; and
in response to the associating, displaying, on the touch-enabled display screen, the first and second graphical user interface objects adjacent to each other, wherein the displaying further comprises displaying a second visual indicator proximate to the first and second graphical user interface objects that indicates that the first and second graphical user interface objects are in a group.

2. The method of claim 1 further comprising:
receiving an unjoin request, the unjoin request being to unjoin the first graphical user interface object and the second graphical user interface object, wherein the unjoin request is received at the touch-enabled display screen from the user; and removing the second visual indicator that indicated that the first and second graphical user interface objects were in the group.

3. The method of claim 2 wherein the receiving of the unjoin request further comprises:
   detecting a single-finger unjoin gesture on the touch-enabled display screen, the detecting comprising:
   detecting a selection of the first graphical user interface object from within the group; and
   detecting a holding of the first graphical user interface object for a third predetermined amount of time;
   displaying a third visual indicator that indicates that the first and second graphical user interface objects are about to be unjoined; and
   detecting, after the display of the third visual indicator, that the user drags the first graphical user interface object away from the second graphical user interface object.

4. The method of claim 2 wherein the receiving of the unjoin request further comprises:
   detecting a double-finger unjoin gesture on the touch-enabled display screen, the detecting comprising:
   detecting a selection of the first graphical user interface object in the group with a first finger and a selection of the second graphical user interface object with a second finger, and
   simultaneously moving the first finger away from the second finger.

5. An information handling system comprising:
   one or more processors;
   a memory accessible by at least one of the processors;
   a touch-enabled display screen accessible by one or more of the processors; and
   a set of instructions stored in the memory and executed by at least one of the processors in order to perform actions of:
   receiving a request to join a first graphical user interface object with a second graphical user interface object, wherein the request is received as a single-finger gesture that is received at the touch-enabled display screen from a user operating the information handling system, the receiving comprising:
   detecting a selection of the first graphical user interface object;
   detecting a movement of the first graphical user interface object adjacent to the second graphical user interface object;
   detecting a holding of the first graphical user interface object adjacent to the second graphical user interface object for a first predetermined amount of time;
   in response to detecting the holding for the first predetermined amount of time, displaying a first visual indicator proximate to the first and second graphical user interface objects that indicates that the objects are about to be joined; and
   detecting a further holding of the first graphical user interface object adjacent to the second graphical user interface object for a second predetermined period of time after the displaying of the first visual indicator, associating the first and second graphical user interface objects with each other in response to receiving the request;
   in response to the associating, displaying, on the touch-enabled display screen, the first and second graphical user interface objects adjacent to each other, wherein the displaying further comprises displaying a second visual indicator proximate to the first and second graphical user interface objects that indicates that the first and second graphical user interface objects are in a group.

6. The information handling system of claim 5 wherein the set of instructions perform further actions comprising:
   receiving an unjoin request, the unjoin request being to unjoin the first graphical user interface object and the second graphical user interface object, wherein the unjoin request is received at the touch-enabled display screen from the user; and
   removing the second visual indicator that indicated that the first and second graphical user interface objects were in the group.

7. The information handling system of claim 6 wherein the receiving of the request further includes further actions comprising:
   detecting a single-finger unjoin gesture on the touch-enabled display screen, the detecting comprising:
   detecting a selection of the first graphical user interface object from within the group; and
   detecting a holding of the first graphical user interface object for a third predetermined amount of time;
   displaying a third visual indicator that indicates that the first and second graphical user interface objects are about to be unjoined; and
   detecting, after the display of the third visual indicator, that the user drags the first graphical user interface object away from the second graphical user interface object.

8. The information handling system of claim 6 wherein the receiving of the request further includes further actions comprising:
   detecting a double-finger unjoin gesture on the touch-enabled display screen, the detecting comprising:
   detecting a selection of the first graphical user interface object in the group with a first finger and a selection of the second graphical user interface object with a second finger, and simultaneously moving the first finger away from the second finger.

9. A computer program product stored in a non-transitory computer readable medium, comprising functional descriptive material that, when executed by an information handling system, causes the information handling system to perform actions comprising:
   receiving a request to join a first graphical user interface object with a second graphical user interface object, wherein the request is received as a single-finger gesture that is received at a touch-enabled display screen from a user operating the machine, the receiving comprising:
   detecting a selection of the first graphical user interface object;
   detecting a movement of the first graphical user interface object adjacent to the second graphical user interface object;
   detecting a holding of the first graphical user interface object adjacent to the second graphical user interface object for a first predetermined amount of time;
   in response to detecting the holding for the first predetermined amount of time, displaying a first visual indicator proximate to the first and second graphical user interface objects that indicates that the objects are about to be joined; and
   detecting a further holding of the first graphical user interface object adjacent to the second graphical user interface object for a second predetermined period of time after the displaying of the first visual indicator, associating the first and second graphical user interface objects with each other in response to receiving the request;

in response to the associating, displaying, on the touch-enabled display screen, the first and second graphical user interface objects adjacent to each other, wherein the displaying further comprises displaying a second visual indicator proximate to the first and second graphical user interface objects that indicates that the first and second graphical user interface objects are in a group.

10. The computer program product of claim 9 wherein the actions further comprise:

receiving an unjoin request, the unjoin request being to unjoin the first graphical user interface object and the second graphical user interface object, wherein the unjoin request is received at the touch-enabled display screen from the user; and removing the second visual indicator that indicated that the first and second graphical user interface objects were in the group.

11. The computer program product of claim 10 wherein the receiving of the request further includes further actions comprising:

detecting a single-finger unjoin gesture on the touch-enabled display screen, the detecting comprising:

detecting a selection of the first graphical user interface object from within the group; and detecting a holding of the first graphical user interface object for a third predetermined amount of time;

displaying a third visual indicator that indicates that the first and second graphical user interface objects are about to be unjoined; and detecting, after the display of the third visual indicator, that the user drags the first graphical user interface object away from the second graphical user interface object.

12. The method of claim 1 wherein the first visual indicator changes from a first representation to a second representation in response to the second predetermined time period elapsing.

13. The method of claim 1 wherein the second visual indicator comprises a line surrounding the first graphical user interface object and the second graphical user interface object.

14. The method of claim 3 wherein the third visual indicator comprises a tile separator bar between the first graphical user interface object and the second graphical user interface object.

15. The information handling system of claim 5 wherein the first visual indicator changes from a first representation to a second representation in response to the second predetermined time period elapsing.

16. The information handling system of claim 5 wherein the second visual indicator comprises a line surrounding the first graphical user interface object and the second graphical user interface object.

17. The information handling system of claim 7 wherein the third visual indicator comprises a tile separator bar between the first graphical user interface object and the second graphical user interface object.

18. The computer program product of claim 9 wherein the first visual indicator changes from a first representation to a second representation in response to the second predetermined time period elapsing.

19. The computer program product of claim 9 wherein the second visual indicator comprises a line surrounding the first graphical user interface object and the second graphical user interface object.

20. The computer program product of claim 11 wherein the third visual indicator comprises a tile separator bar between the first graphical user interface object and the second graphical user interface object.

* * * * *